United States Patent [19]
Nakane et al.

[11] Patent Number: 4,954,818
[45] Date of Patent: Sep. 4, 1990

[54] MULTI-WINDOW DISPLAY CONTROL SYSTEM

[75] Inventors: Keiichi Nakane; Tadashi Kuwabara; Naoya Ikeda; Hiroyuki Koreeda; Hiroaki Aotsu, all of Yokohama; Masaki Kawase, Katsuta; Yujiro Tatsuno, Hitachi; Naomichi Nonaka; Kazunari Suzuki, both of Yokohama, all of Japan

[73] Assignees: Hitachi, Ltd., Tokyo; Hitachi Microsoftware Systems, Inc., Yokohama, both of Japan

[21] Appl. No.: 920,425

[22] Filed: Oct. 20, 1986

[30] Foreign Application Priority Data

| | | | |
|---|---|---|---|
| Oct. 18, 1985 | [JP] | Japan | 60-231191 |
| May 19, 1986 | [JP] | Japan | 61-112632 |
| Sep. 19, 1986 | [JP] | Japan | 61-219633 |

[51] Int. Cl.[5] .......... G06F 3/14
[52] U.S. Cl. .......... 340/721; 340/799
[58] Field of Search .......... 340/721, 724, 747, 750, 340/799, 798, 734, 712

[56] References Cited

U.S. PATENT DOCUMENTS

| | | | |
|---|---|---|---|
| 4,202,041 | 5/1980 | Kaplow et al. | 340/712 |
| 4,484,302 | 11/1984 | Cason et al. | 340/721 |
| 4,555,775 | 11/1985 | Pike | 340/721 |
| 4,642,790 | 2/1987 | Minshull et al. | 340/724 |
| 4,651,146 | 3/1987 | Lucash et al. | 340/750 |

*Primary Examiner*—Alvin Oberley
*Attorney, Agent, or Firm*—Antonelli, Terry, Stout & Kraus

[57] ABSTRACT

A central processing unit, a main memory for storing graphic or character data, an external memory, an input device for inputting the graphic or character data, a shared memory for temporarily storing the graphic or character data read by the central processing unit, a display processing means for preparing a plurality of display data displayed on a display from the graphic or character data on the shared memory, and a display memory for storing the plurality of display data are connected to a bus. The display memory, the shared memory, and the external memory have first, second and third save areas for temporarily saving the overlapped display data when the plurality of display data are overlapped. The main memory is provided with a first control table for controlling display position, mutual priority for display, and a save area during overlap, regarding each of the plurality of display data stored in the display memory. The display processing means controls to display the plurality of display data on the display using the first table, the first, second and third save areas, and the display memory. In the first, second and third save areas, the first save area has highest priority and the third save area has lowest priority.

15 Claims, 21 Drawing Sheets

FIG. 4E
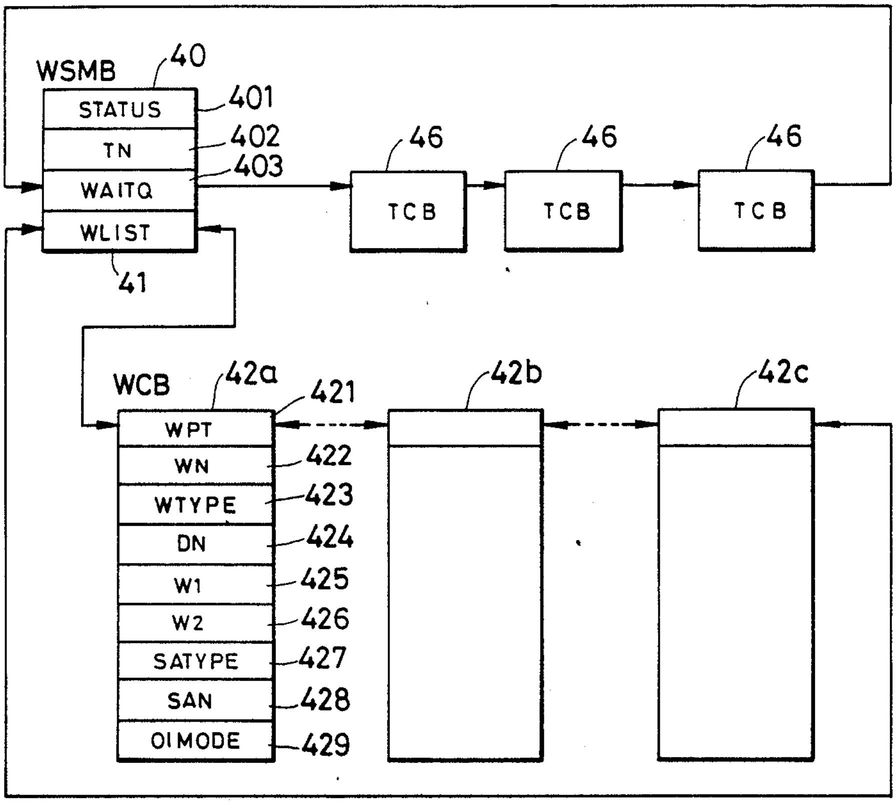
FIG. 4G
FIG. 4F
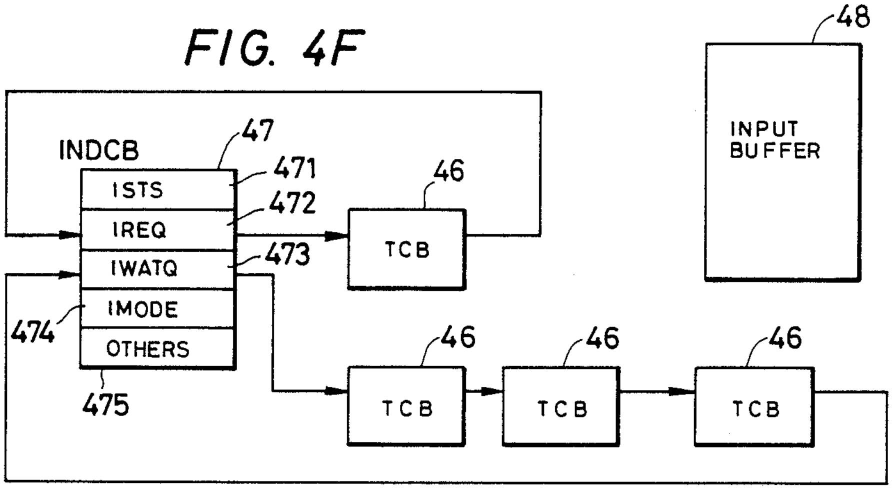

SAVE IMODE (Addr (WCB))

RESUME IMODE (Addr (WCB))

MULTI-WINDOW DISPLAY CONTROL SYSTEM

BACKGROUND OF THE INVENTION

The present invention relates to a data display control system in a raster-scan-type display device having a frame memory, and more particularly to a data display control system wherein a plurality of data are displayed simultaneously on a display surface of one display device so as to constitute a multiplex display surface.

In recent years, interactive operation using a display device has become a significant part of personal computer processing as well as various other instruments designed for processing data. In such situations, the simultaneous display of a plurality of data onto one display device becomes an important problem to solve in order to make the operation of such instruments by a user easy and efficient. Various companies of Japan and foreign countries have offered solutions to this problem. A specific example of a multi-window display control system is described in detail in Gregg Williams, "The Lisa Computer System", *BYTE,* Feb. 1983, p. 33-50.

In systems similar to the Lisa computers, multi-window display control systems, a major disadvantage is how efficiently the overlapped state of the display areas during the output of display data is controlled, and how rapidly the overlapped state is processed during operation of the display areas and the display data. For example, a common method is that overlapped parts between a new display surface (window) and a plurality of existing display surfaces (windows) are saved per each window. In this method, comparison calculation of coordinate positions of each window frequently occurs, and the number of data transfers for save or recovery increases thereby control of the save state is difficult.

SUMMARY OF THE INVENTION

An object of the invention is to provide a multi-window display control system wherein a plurality of data are overlapped and displayed simultaneously on one display device, and when the display positions are mutually changed redisplay or save of the overlapped part can be realized most effectively.

Another object of the invention is to provide a multi-window display control system wherein when a plurality of data are overlapped and displayed simultaneously on one display device, the priority for display can be fixed and the display of new data can be suppressed until the prescribed operation is finished.

Another object of the invention is to provide a multi-window display control system wherein when a plurality of data are overlapped and displayed simultaneously on one display device, even if the display position relationship of each display data is changed, only data displayed on the front window can be made the data input object.

In order to attain the above objects, the invention is provided with a first save area installed in a frame memory for temporarily saving the overlapped part of display data, a second save area installed in a memory area for communication between a display device and a central processing unit, a third save area installed in an external memory if necessary, and a first control table for controlling display position of data, the priority of display between data and the save area during the overlap regarding each of a plurality of display data stored in the frame memory. Wherein a display processor controls the display of the plurality of display data using the first control table, the first, second and third display data save areas, and the frame memory.

Further in the invention, the display data are controlled and separated into general data and special data such as emergency message or menu command, and the first save area is controlled and separated into a save area of display data overlapped by the special data and a save area of display data overlapped by the general data. Regarding the saving of general data, when the first save area on the frame memory overflows the second save area is used, and when the second area further overflows the third save area installed in the external memory is used. The first control table controls the display position of data on the display device and the priority for display per each display data. If the data are overlapped, the whole data relating to the display are saved in any of the save areas and controlled. The most efficient processing is performed when the position or content of the display data is changed.

In the invention, data such as menu command or emergency message is different from ordinary data and nearly formalized in itself. Moreover, since a good response property of the display is requested and the priority for display is always the highest, such data is distinguished from ordinary data and called special data. On the contrary, ordinary data is called general data. Corresponding to the calling, in the invention, a window representing the special data and a save area of the display data hidden by this are called special window and special save area or buffer respectively. A window representing the general window and general save area or buffer respectively.

In the invention, regarding each of a plurality of display data stored in a frame memory, in addition to the first control table to control the display position of data and the priority for display between data, a second control table is installed so as to control the task number and the window reservation setting regarding the display data of the highest priority among a plurality of display data and further the wait queue for display request.

When the task of display data of the front surface can set the window reservation and the window reservation is set to the second control table and other task newly requests the display or the priority for display of the existing data is changed, if the window reservation setting in the second control table is checked and the window reservation is set, wait state occurs to the wait queue for display request in the second control table and the display request or the display changing request is suppressed, thereby the operator while task updating the display data at the front surface can execute the processing without any interference from other data display task.

Further in the invention, a third control table is installed so as to control the wait queue for input completion, the wait queue for privileged input request and the current input mode data. The first control table controls the input mode data regarding each display data.

That is, only the data input request from the first task of the display data at the front surface can be received and the input mode data of the received input request is set to the third control table and the wait queue is formed in the third control table so that the first table waits until the input completion. When the second task, with the display data not being in the front surface, requests data input, the input request is not received but the wait queue for privileged input request is formed in the third control table so that the second task waits until the display data regarding the second task is displayed at the front surface.

When the position relation of the display data is changed and the display data being not in the front surface is newly displayed at the front surface, the queue arrangement in the first control table and the task number of the display data at the front surface in the second table are changed, and the input mode data controlled by the third control table is saved to the first control table regarding data displayed at the front surface until that time. If the wait queue for input completion exists then, the wait state is changed to the wait queue for privileged input request. If the third task with data displayed newly at the front surface is contained in the wait queue for privileged input request, the wait state is changed to the wait for input completion and the input mode data regarding the third task saved to the first control table is resumed in the third control table. In this condition, only data displayed at the front surface can be always inputted.

BRIEF DESCRIPTION OF THE DRAWINGS

FIGS. 4A–4G are schematic diagrams respectively illustrating an embodiment of a control table used in a multi-window display control system of the invention;

DESCRIPTION OF THE PREFERRED EMBODIMENTS

Embodiments of the invention will new be described referring to the accompanying drawings.

Figure 2A:
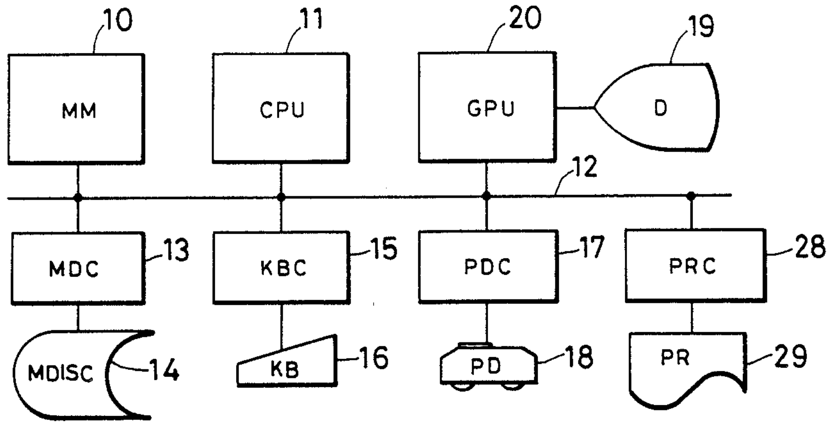
FIGS. 2A, 2B are a block diagram illustrating an example of computer system to which a multi-window display control system of the invention is applied, and a block diagram illustrating an example of a graphic display device in system respectively.

FIG. 2A shows an example of a computer system according to the invention, for example, a word processor or a personal computer. The system comprises a main memory (MM) 10, a central processing unit (CPU) 11, a graphic display device (GPU) 20, a display device (D) 19, a magnetic disk (MDISC) 14, a magnetic disk controller (MDC) 13, a keyboard (KB) 16 as input device, KB control unit (KBC) 15, a pointing device (PD) 18 as input device such as mouse, PD controller (PDC) 17, printer (PR) 29, printer controller (PRC) 28 and a common bus 12.

Figure 2B:
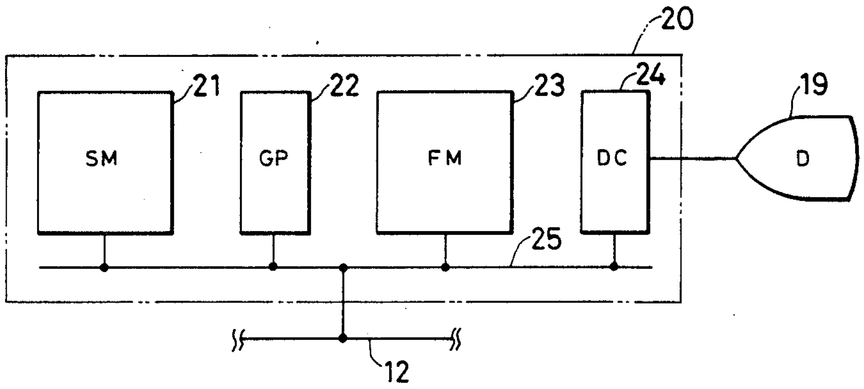

The GPU 20 as shown in FIG. 2B comprises a shared memory (SM) 21, a graphic display processing unit (GP) 22, a frame memory (FM) 23 and a display controller (DC) 24, all connected by an inner bus 25.

Display control method of the invention will be briefly described using FIGS. 2A, 2B. When graphic form or character is displayed into D 19 according to program Pl being executed in the CPU 11, the graphic or character data to be displayed (In general, these are graphic drawing primitive command sequence or character code sequence.) is transferred from the MM 10 the SM 21 according to program Pl and then the execution command is requested to the GP 22. The GP 22 receiving the execution command is requested to the GP 22. The GP 22 receiving the execution command takes out the graphic data or the character data from the SM 21 and explodes the data into displaying dot data (display data) corresponding to each display position on the D 19 and stores the display data at portion corresponding to display position on the FM 23. ON the other hand, the DC 24 of the GPU 20 scans the FM 23 at constant period, and performs display on the D 19 according to the scanning content. Consequently, the display data stored in the FM 23 is immediately displayed on the D 19 by the DC 24.

Figure 3A:
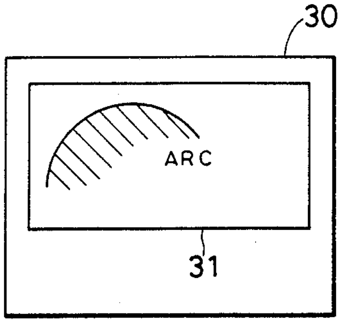
FIGS. 3A–3F are schematic diagrams respectively illustrating display examples in a multi-window display control system of the invention.
Figure 3B:
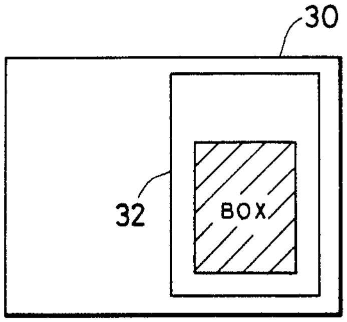
Figure 3C:
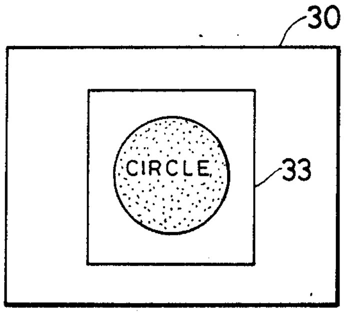
Figure 3D:
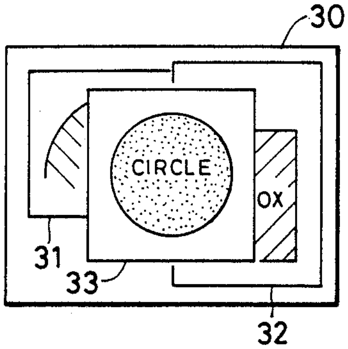

FIGS. 3A-3F illustrate display examples according to a multi-window display control system of the invention. FIG. 3A shows an example of one general data displayed on a rectangular display area (hereinafter referred to as "window") 31 of a display surface 30 of the D 19. FIGS. 3B, 3C respectively show examples of windows 32, 33 each displaying one general data. FIG. 3D shows an example of the display surface 30 on which the display content of FIGS. 3A, 3B, 3C are simultaneously displayed according to a multi-window display control system of the invention. In this case, it is assumed that the windows are displayed in the order of 31, 32, 33, i.e., the priority for display of the window 33 is the highest.

Figure 3E:
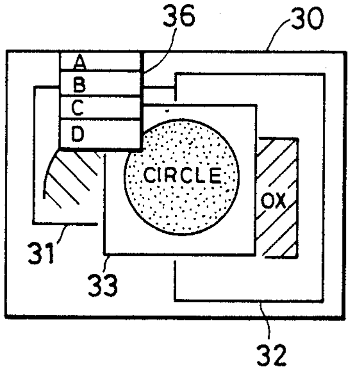
Figure 3F:
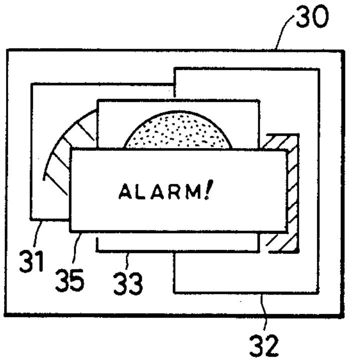

FIG. 3E shows an example where, in the state of FIG. 3D, menu command being one of the special data is displayed on a special window 36, and FIG. 3F shows an example where, in the state of FIG. 3D, emergency message being one of the special data is displayed on a special window 35.

Figures 1A, 1B:
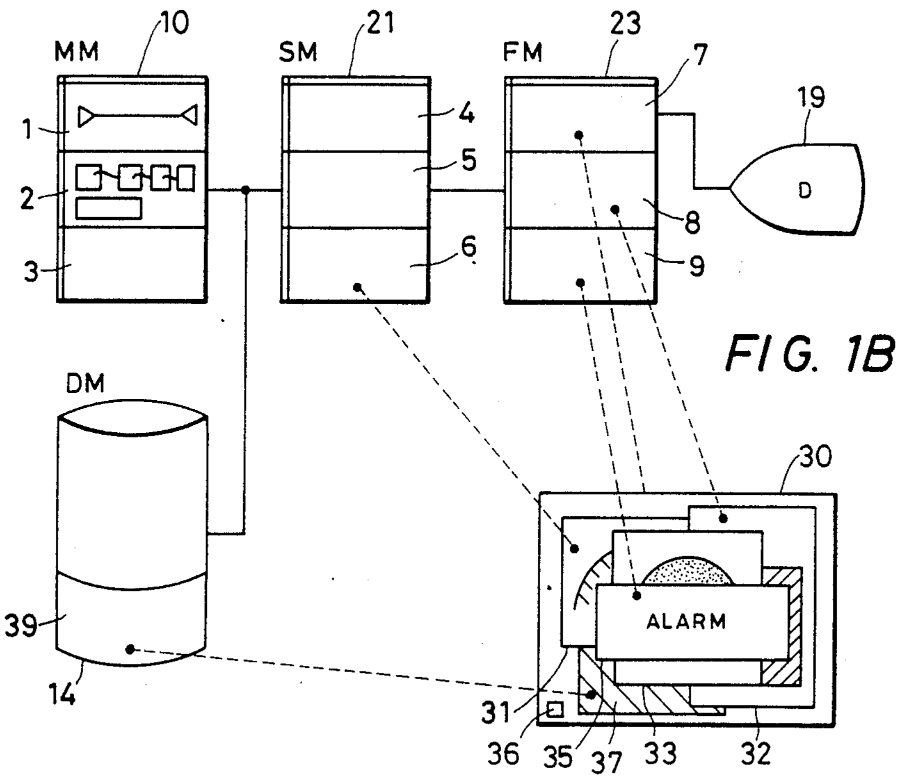
FIGS. 1A, 1B are a block diagram and a schematic diagram of a display example of multi-window respectively illustrating the make-up of a memory in a multi-window display control system of the invention.

In the above-mentioned examples of multi-window display, storage positions regarding display data and overlapped data will be described. FIGS. 1A, 1B are drawings illustrating a multi-window display control system of the invention noting the data storage positions. In FIG. 1A, the MM 10 comprises a program storage area 1 including control program as hereinafter described, a control table storage area 2 including first, second and third control tables, and a data area 3 storing program of a user and graphic or character data. The SM 21 comprises a command area 4 storing data being necessary for the display and transmitted from the data area 3 of the MM 10 by the CPU 11, a transmission buffer area 5 for transferring the display data stored or saved in the external memory 14 such as disk or the MM 10 into the FM 23, and a receiving buffer 6 for saving or storing the display data of the FM 23 into the external memory 14 or the MM 10. The FM 23 comprises a display buffer 7 for storing the display data in the D 19, a special save buffer 9 for saving the display data overlapped by the special data window, and a general save buffer 8 for saving the display data of a window overlapped by general data windows. The external buffer memory 14 is provided with a save area 39 for the window display data.

Figure 4A:
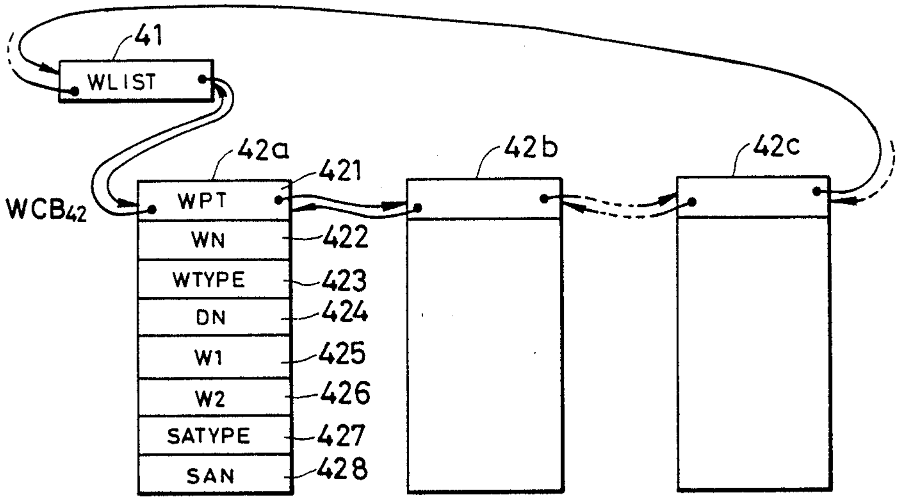

If multi-window display such as the display surface 30 shown in FIG. 1B is performed, the display data of the shown display surface is stored in the display buffer 7 of the FM 23, and the display data of the position of the special window 35 immediately overlapped by the special buffer 9 of the FM 23. The general save buffer 8 of the FM 23 stores the whole display data of a general window 32 saved when a window 33 is displayed. Further, the receiving buffer 6 of the SM 21 stores the whole display data of a general window 31 saved when the general window 32 is displayed. The save area 39 of the external memory 14 stores the whole display data of a general window 37 saved when the general window 31 is displayed. Although the general save buffer 8 of the FM 23, the transmission buffer 5, the receiving buffer 6 of the SM 21 is described herein as having stored therein one display surface per each buffer for simplification, in normal operation usually prepared by a plurality of display surfaces per each buffer. A mark 36 shown in the display surfaces 30 of FIG. 1B represents a blinking mark informing generation of wait state for window display as hereinafter described FIGS. 4A-4D show an embodiment of control tables in a multi-window display control system of the invention. Window control block (WCB) 42 shown in FIG. 4A is a first control table in the invention, and controls size and display position of each window, the display data number, window type, save area information of the display data by overlap of the window or the like. Every time a window is defined, the WCB 42 is connected to WCB list pointer (WLIST) 41 in the order of higher priority for display (That is, the top address of the WCB 42*a* is stored in the WLIST 41.).

The WCB 42 comprises a WCB pointer (WPT) 421 indicating WCB relating to a window having next lower priority for display (WCB 42*b* in the case of WCB 42*a*), corresponding window number (WN) 422, window type (WTYPE) 423, displayed data number (DN) 424, coordinate of left-upper corner of a window (W1) 425, coordinate of right-lower corner of a window (W2) 426, save area type (SATYPE) 427 indicating save area, and save area number (SAN) 428. A list connecting between the WLIST 41 and the WPT 421 of the WCB 42 is a bidirectional list. Following symbols are used in the description of the embodiment. In the WTYPE, numeral 1 designates a general window and numeral 2 designates a special window. In the SATYPE, F designates a general save area 8 of the FM 23, S designates a receiving buffer 6 of the SM 21, and D designates a save area 39 of the external memory 14.

Figure 4B:
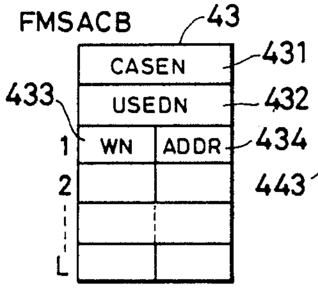
Figure 4C:
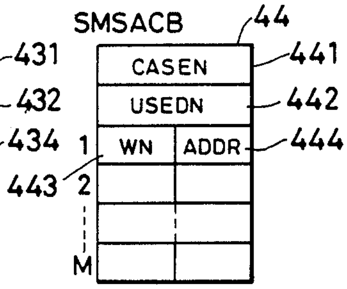
Figure 4D:
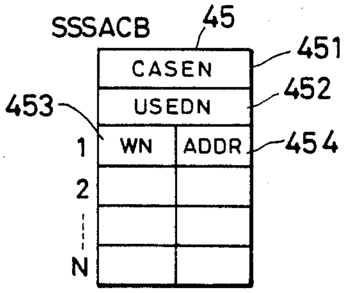

The relationship between each area and the saved window display data in the general save buffer 8 of the FM 23, the receiving buffer 6 of the SM 21 and the save area 39 of the external memory 39, as shown in FIGS. 4B, 4C, 4D, is controlled by general save buffer area control block (FMSACB) 43, receive buffer area control block (SMACB) 44, and save area control block (SSSACB) 45. The elements of respective prepared save areas (CASEN) 431, 441, 451, the number of used areas (USEDN) 432, 442, 452, the number of windows saved in each area (WN) 433, 443, 453, and top address of the area (ADDR) 434, 444, 454.

Each field is used as follows. For example, in the FMSACB 43, when a general window A is to be displayed, and a window B has been already displayed. Then data of the window B is saved to the general save buffer 8 of the FM 23. At first the CASEN 431 of the FMSACB 43 is compared with the USEDN 432. If the former is larger than the latter, decision is that the general save buffer of the FM 23 still contains empty area. Whether the WN 433 is zero or not is examined and an empty area is found. The top address of the save area in the general save buffer 8 is obtained from the corresponding ADDR 434, and the data of window B is saved to the area. The window number of the window B is set to the WN 433 at that time, and further the USEDN 432 of the FMSACB 43 is added by 1. On the other hand, when data of the window B is resumed on the display surface, the WN 433 of the FMSACB 43 being coincident to the window number B is searched. The data of the window B stored in the save area within the general save buffer 8 shown by the corresponding ADDR 434 at that time is resumed to the display buffer of the FM 23. The WN 433 of the FMSACB 43 is cleared to zero, and the USEDN 432 is subtracted by 1.

In the invention as above described, the display dot data exploded and stored in the display buffer 7 of the FM 23 is dealt with as save data of overlapped data between windows. Therefore, processing required for redisplay of the display data during changing of the display position can be executed in a short time in comparison to the case that the graphic or character data stored in the SM 21 is exploded again into the dot data through the GP 22. Also in the invention, the method for saving overlapped data between general windows is that when a general window is newly displayed, the window that was displayed immediately before the new display is stored and the whole window display data displayed immediately before that time is saved. According to this method, as hereinafter described in detail, the data transfer number for save or recovery can be decreased and the save state can be easily controlled.

Figure 5A:
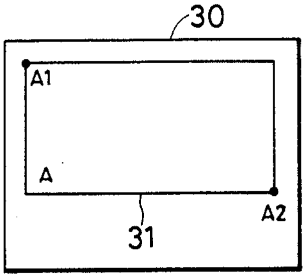
FIGS. 5A–5P are schematic diagrams of display window examples illustrating specifically a multi-window display control system of the invention, and a control table corresponding to the display window examples.

An example of specific multi-window display using control tables shown in FIGS. 4A–4D will be described in detail referring to FIGS. 6A–13. FIGS. 5A–5P show display window examples in a multi-window display control system of the embodiment and state of the control table WCB 42 (FIG. 4A) then. In the control table WCB 42 shown, numeral 429 designates input mode data (OIMODE), which has no relation to the embodiment and shall not be described. FIGS. 6–12 show process sequence (flow chart) in the GP 22 (FIG. 2B) of a multi-window display control system in the embodiment. Process sequence of commands of write of display data (WRITE-WINDOW) 600, priority of displayed data (POP-UP-WINDOW) 800, moving of display area (MOVE-WINDOW) 1000, and clear of display data (CLEAR-WINDOW) 1200.

(I) WRITE-WINDOW

Figure 5B:
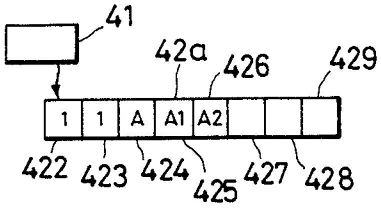

FIGS. 5A–5F show the operation of the WRITE-WINDOW command as it is used. The windows 31, 32, 33 are defined on the display surface 30 in sequence and data A, B, C are displayed respectively. First, the process sequence of the command in FIG. 5A will be described referring to FIG. 6A. Receiving the command accompanied by the window number WN=1, the window type WTYPE=1 (general), the segment data number DN=A, and coordinates of left-upper and right-lower corners of the window W1=A1, W2=A2, the GP 22 obtains a vacant WCB 42*a* and insert it in the first stage of the WCB list designated by the WLIST 41 (block 620). Next, WN=1, WTYPE=1, DN=A, W1=A1 and W2=A2 are registered in the WCB 42*a* (block 610). Further, the WPT 421 of the WCB 42*a* is examined, and whether any window was already displayed or not is discriminated (block 630). In this case, since the window is displayed for the first time, the decision becomes NO (none) and the process is advanced to block 650. Finally, the GP 22 explodes the designated data A into display data, and writes the display data in portion corresponding to the rectangular area of the window coordinates Al, A2 of the FM 23. As a result, the display surface 30 becomes as shown in FIG. 5A and the WCB 42*a* at that time becomes as shown in FIG. 5B.

Next, studying will be performed in the case that the general window 32 is defined by the WRITE-WINDOW command accompanied by the window number WN =2, the window type WTYPE=1, the segment data number DN=B, and the window coordinates W1=B1, W2=B2 on the window 31, and the data B is displayed as shown in FIG. 5B. The command process sequence in the GP 22 until blocks 610–630 is similar to the above description. In this case, since whether any window was already displayed or not is discriminated YES (present), process is advanced to block, 640 and subroutine (SAVE WINDOW) 700 is executed.

Figure 7:
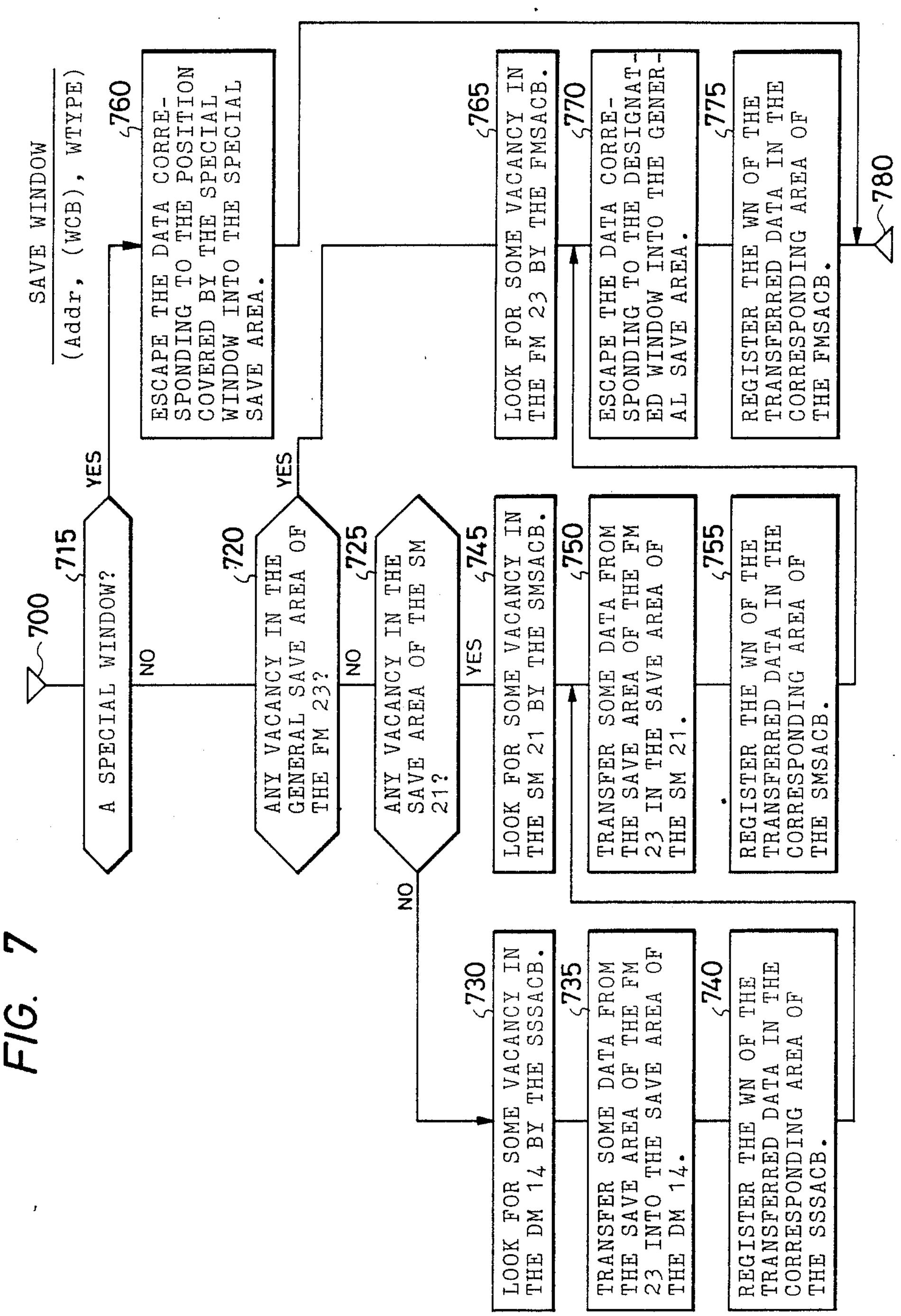
FIG. 7 is a flow chart illustrating an embodiment of subroutine SAVE WINDOW in the write command of display data in FIGS. 6A, 6B.

FIG. 7 shows the process sequence of the SAVE WINDOW 700. The SAVE WINDOW 700 discriminates the window type. If the window is a special window (WTYPE=2), overlapped dot data (display data) is saved in the special save buffer 9; if it is a general window (WTYPE=1), the whole display data of a window with highest priority among the already displayed windows is saved to any suitable area of the general save buffer 8, the receive buffer 6 and the save area 39. Parameter transferred to the SAVE WINDOW 700 is address of the WCB corresponding to the window with display data to be saved and the window type of the new window to be overlapped. In this case, the parameter is address of the WCB 42*a* and the WTYPE. In processing of the SAVE WINDOW 700, whether the window is a special window or not is first discriminated from the given window type (block 715). If it is a special window, the process is advanced to block 760 and the position coordinates W1, W2 are obtained from the WCB of the special window. The display data in the display buffer 7 corresponding to the coordinates is saved in the special save buffer 9 (block 760) and control is returned to the routine calling the subroutine (block 780). In this case, however, since the window 32 is not a special window but a general window, process is advanced to block 720 and so forth, and any subsequent processing is performed according to the state of respective save areas.

If there is any empty area in the general save buffer 8 of the FM 23, blocks 765–775 are processed, and the coordinates W1, W2 of the overlapped window (Al, A2 in this case) are obtained from the designated WCB. The corresponding display data of the display buffer 7 is saved to the general save buffer 8 being vacant, and the saved window number is set to the corresponding area of the FMSACB 43. Process is advanced to block 780 and returned to the calling routine.

If the general save buffer 8 of the FM 23 is filled and the receive buffer 6 of the SM 21 includes empty area, the overlapped display data of the general save buffer 8 is transferred to the receive buffer 6 (blocks 745–755), and the overlapped display data in the display buffer 7 is saved to the general save buffer 8 being vacant in a manner similar to the above case (blocks 770–775).

If both the general buffer 8 of the FM 23 and the receive buffer 6 of the SM 21 are filled, the overlapped display data of the receive buffer 6 is transferred to the save area 39 (blocks 730–740), and the overlapped display data of the general save buffer 8 is transferred to the receive buffer 6 being vacant (blocks 750–755), and further the overlapped display data in the display buffer 7 is saved to the general save buffer 8 being vacant similarly to the above description (blocks 770–775).

Figure 5C:
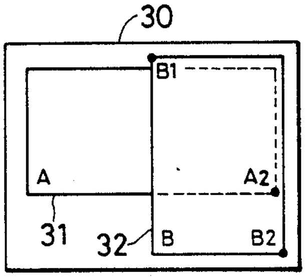
Figure 5D:
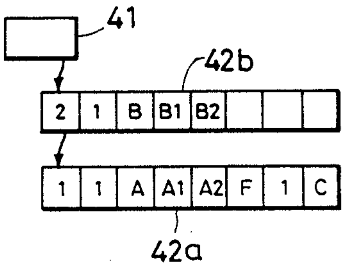

In this case (FIG. 5C), since the general save buffer 8 includes empty area, blocks 765–775 are processed. As a result, "F" representing the general save buffer 8 is set to the SATYPE 427 of the WCB 42*a* as shown in FIG. 5D, and "1" is set to the SAN 428. Then control is returned to the calling origin of the subroutine. In this case, control is returned to the block 650 of the WRITE-WINDOW 600 of FIG. 6A. The GP 22 explodes the designated data B into display dot data, and writes the display data into the rectangular area corresponding to the window coordinates B1, B2 of the display buffer 7 the FM 23. As a result, the display surface 30 becomes as shown in FIG. 5C, and relation of the WBC 42*a*, 42B at that time becomes as shown in FIG. 5D. Signal set to the save area type SATYPE 427 in the WCB 42 becomes "F" in the case of the general save buffer 8, and becomes "D" in the case of the save area 39 as above described.

Figure 5E:
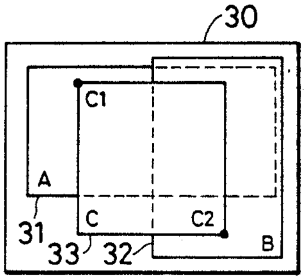
Figure 5F:
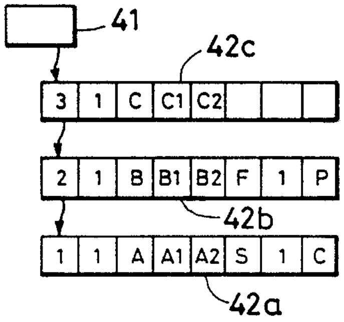

Further studying of the case in which the general window 33 is defined on the windows 31, 32 and the data C is displayed as shown in FIG. 5E. Receiving the WRITE-WINDOW command accompanied by the window number 3, the window type 1, the segment data number C, and the window coordinates W1=Cl, W2 =C2, the GP 22 executes process sequence of FIG. 6A and FIG. 7 as above described If the general save buffer 8 is only one case then, there is no empty area and therefore blocks 750–755, 770–780 are executed in processing of the SAVE WINDOW 700. The display data of the general window 13 is saved to the receive buffer 6, and the display data of the general window 32 is saved to the general save buffer 8. As a result, relation of the WCB 42 becomes as shown in FIG. 5F. That is, "S" representing the receive buffer 6 is set to the SATYPE 427 of the WCB 42*a* regarding the display data of the general window 31, and "1" is set to the SAN 428. (II) POP-UP-WINDOW Dig. 5G shows a result that the window 31 with lowest priority for display in the state of FIG. 5E is made the window with the highest priority for display using the POP-UP-WINDOW command and displayed at the front surface. Process sequence of the command will be described referring to FIG. 8A and FIG. 9.

Figure 9:
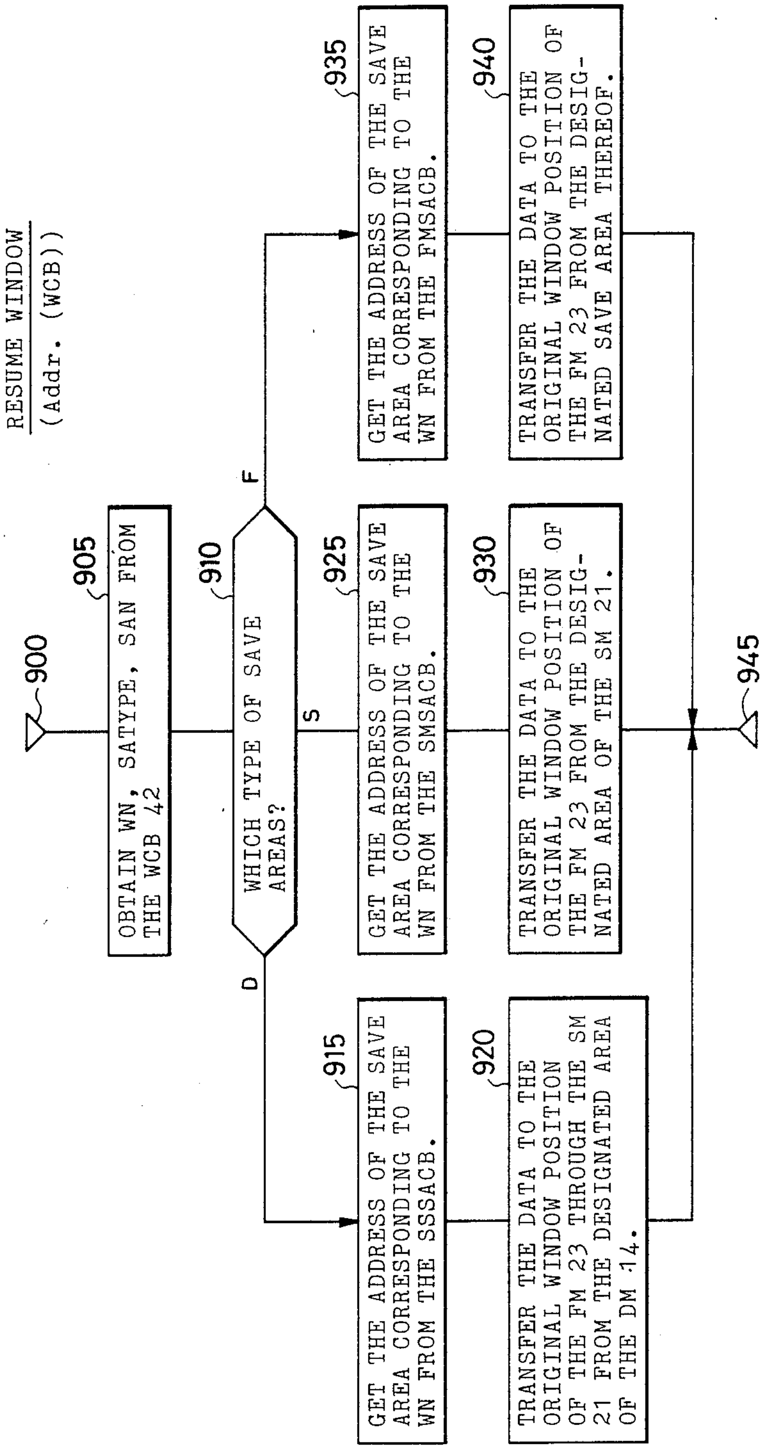
FIG. 9 is a flow chart illustrating subroutine RESUME WINDOW in the command of POP UP WINDOW in FIGS. 8A, 8B.
Figure 10:
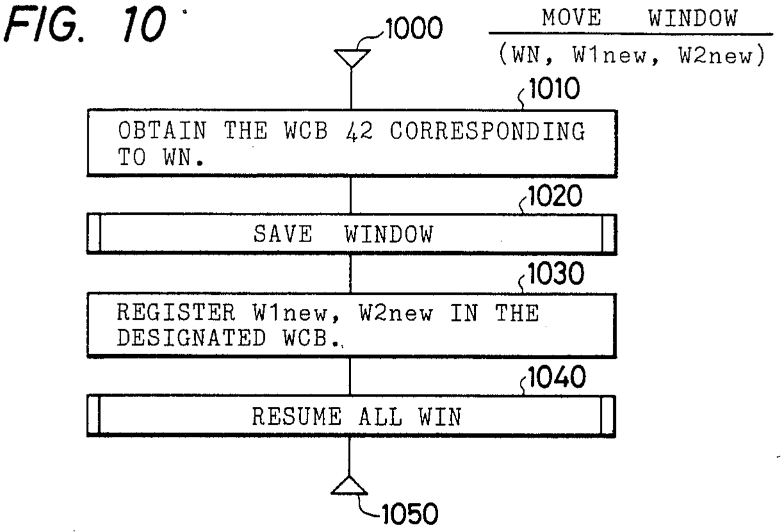
FIG. 10 is a flow chart illustrating an embodiment of moving command of display area in multi-window display control system of the invention.

Receiving the command accompanied by the window number WN=1, the GP 22 first looks for the WCB 42*a* corresponding to the designated WN=1 by searching the list designated by the WLIST 41, and obtains the top address of the WCB 42*a* (block 810). If there is no window with higher priority for display than the designated window WN=1, the command processing is finished immediately (block 820). In this case, since the window with higher priority exists, control is advanced to the block 830. The GP 22 the top address of the previously obtained WCB 42*a* to the WLIST 41 thereby connects the WCB 42*a* to the front stage of the list shown by the WLIST 41 (block 830). Next the GP 22 executes the subroutine SAVE WINDOW 700 and saves the newly overlapped display data (block 840). The GP 22 subsequently executes the subroutine RESUME-WINDOW 900, and resumes the display data regarding the window WN=1 saved by overlap until then so as to redisplay all data of the window The parameter supplied to the subroutine SAVE-WINDOW 700 is the top address of the WCB 42*c* which is connected to the front stage of the WLIST 431 before the previously obtained WCB 42*a* is connected, and the window type WTYPE. Process sequence of the subroutine was already described and therefore shall be omitted here. As a result of processing the subroutine 700, the display data of the window 31 is saved to the save area 39, the display data of the window 32 is saved to the receive buffer 6, and the display data of the window 33 is saved to the general save area 8. State of each control table then becomes as shown in FIG. 5P. Parameter transferred to the subroutine RESUME-WINDOW 900 in block 850 is the top address of the WCB 42*a* corresponding to the window 31 to resume the overlapped display data. FIG. 9 shows process sequence of the RESUME-WINDOW 900.

The GP 22 transfers control to the RESUME-WINDOW 900, and obtains the window number (WN) corresponding to the window 31, the save area type (SATYPE), the save area number (SAN) from the WCB 42*a* (block 905). The save area type is discriminated (block 910), processing is performed corresponding to type of respective save areas (blocks 915–920, 925–930, 935–940), and process is returned to the calling origin of the subroutine (block 945). Processing content is different per each save area type in strict sense, but roughly speaking it becomes as follows. Address of the save area coincident to the designated WN is obtained form the corresponding save area control block, and the save display area control block, and the save display data is taken from the area and then transferred to position corresponding to the original window display area in the display buffer 7 of the FM 23. Designated area of the save area control block is cleared, and the used area number is added by −1. In this case, the save data of the general window 31 is taken from the save area 39 of the external memory 14. When all processings are finished, process is returned to the POP-UP-WINDOW command 800 and processing of the whole command is finished. As a result , the display surface 30 becomes as shown in FIG. 5G, and relation of the WCB at that time becomes as shown in FIG. 5H.

(III) MOVE-WINDOW

Figure 5G:
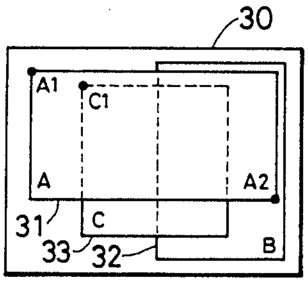
Figure 5H:
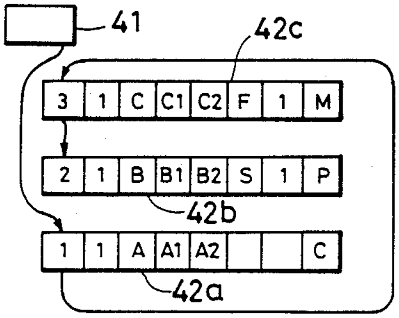
Figure 5I:
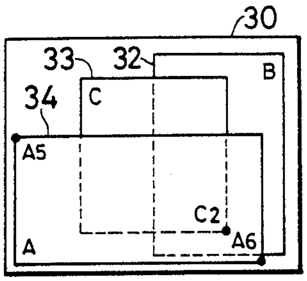

FIG. 5I shows a result where the display position of the window 31 with highest priority for display in FIG. 5G is moved to a new window 34 using the MOVE-WINDOW command 1000. Process sequence of the command will be described referring to FIG. 10.

Figure 11:
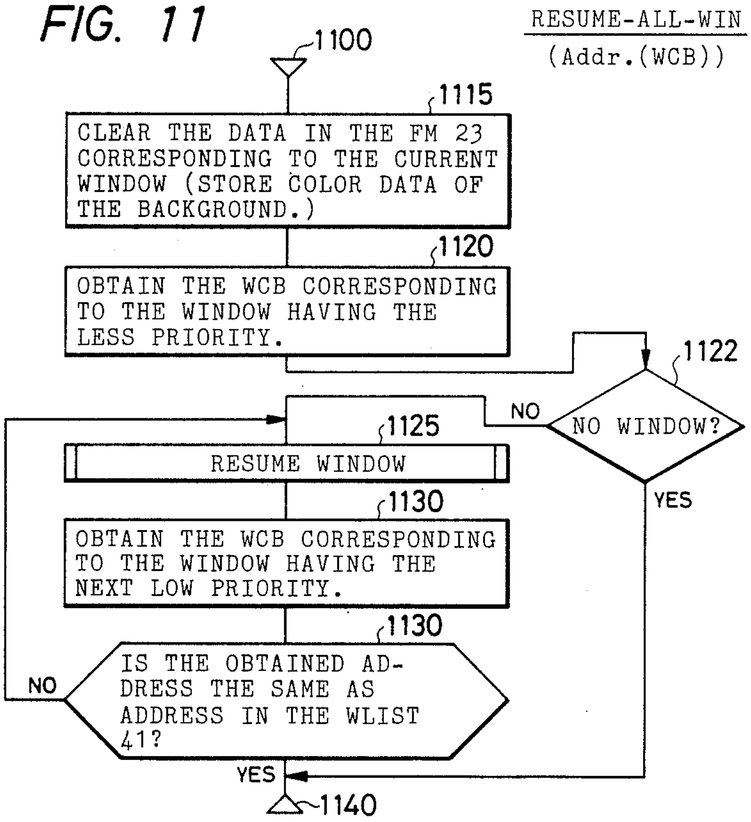
FIG. 11 is a flow chart illustrating an embodiment of subroutine RESUME-ALL-WIN in the moving command of display area in FIG. 10.

Receiving the command accompanied by the number of the window to be moved WN=1, and the new window display position coordinates WIN=A5, W2N=A6, the GP 22 obtains the WCB 42*a* corresponding to the WN=1 from the WCB list designated by the WLIST 41 (block 1010). The SAVE WINDOW subroutine is called, and the dot data of portion corresponding to the window position Al, A2 is saved from the display buffer 7 of the FM 23 to the general save buffer 8 (block 1020). The new window position (A5, A6) is registered to the WCB 42*a* (block 1030). In order to redisplay other window content covered by the window area, the routine RESUME-ALL-WIN 1100 shown in FIG. 11 is executed (block 1040). Parameter to the RESUME-ALL-WIN 1100 may be only the top address of the WCB 42*a*.

The GP 22 begins to execute the RESUME-ALL-WIN 1100, and clears area corresponding to the window position A1, A2 on the FM 23 (block 1110). If color of the background is specified, the area is fully coated by the background color.

Figure 5J:
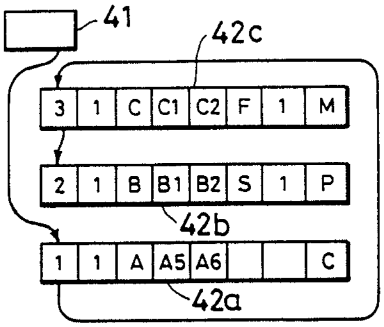

The WCB address of the window with lowest priority is obtained from the list of the WLIST 41 (block 1120). If there is any other window (block 1122), the save display data of the window is displayed again using the RESUME-WINDOW subroutine 900 (block 1125). Further, the WCB address of the window with next high priority is obtained (block 1130), and the processings of blocks 1125–1130 are executed until the top of the list of the WLIST 41. As a result, the display data regarding the necessary windows can be all reproduced. The display surface 30 becomes as shown in FIG. 5I, and state of each control table at that time becomes as shown in FIG. 5J.

(IV) CLEAR-WINDOW

Figure 5K:
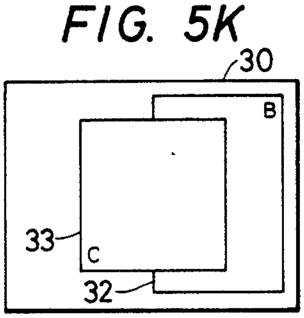
Figure 12A:
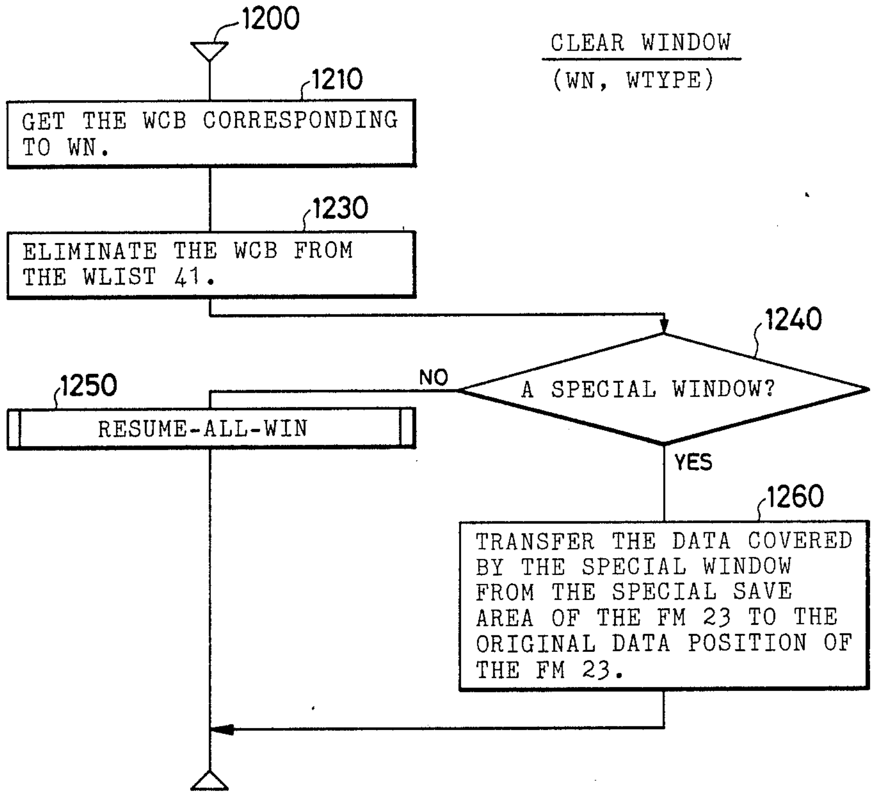
FIGS. 12A, 12B are flow charts respectively illustrating first and second embodiments of clear command of display control system of the invention.

FIG. 5K shows a result that the window 34 with highest priority for display is eliminated using the CLEAR-WINDOW command Process sequence of the command will be described referring to FIG. 12A Receiving the CLEAR-WINDOW command 1200 accompanied by the window number WN=1, and the window type WTYPE=1, the GP 22 immediately obtains the top address of the WCB 42*a* corresponding to the WN=1 (block 1210). The WCB 42*a* is eliminated from the list shown by the WLIST 41 into vacant state (block 1230).

Figure 5L:
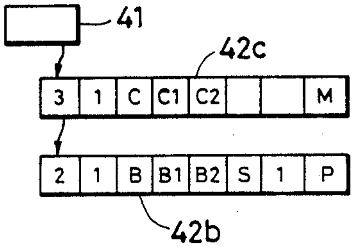

Whether the window is a special window or not is discriminated (block 1240). If so, the process is advanced to block 1260, and the display data covered by the special window is taken from the special save area 9 of the frame memory and then returned to the original position of the frame memory. Since this case relates to the general window, process is advanced to block 1250. Finally in block 1250, the subroutine RESUME-ALL-WINDOW 1100 is executed, and the similar manner to the above description of the MOVE-WINDOW 1000. As a result, the display surface 30 becomes as shown in FIG. 5K, and the relevant control table becomes as shown in FIG. 5L.

Figure 5M:
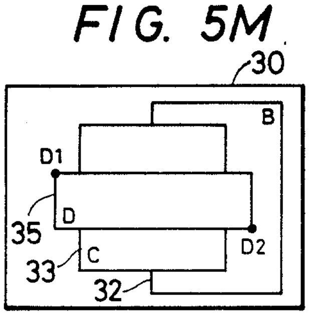
Figure 5N:
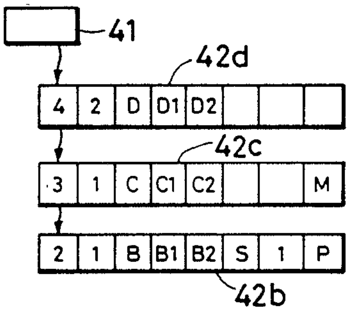
Figure 5O:
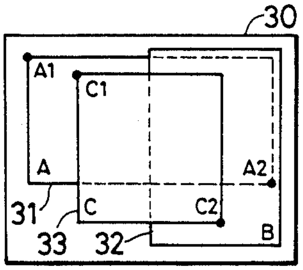
Figure 5P:
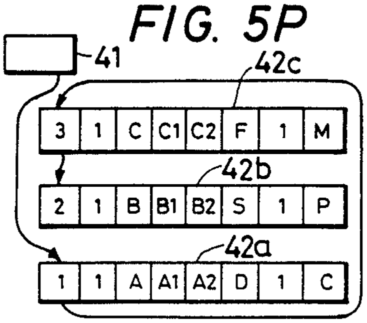

FIG. 5M shows the display surface 30 when the special window 35 is displayed in the state of FIG. 5K. The WRITE-WINDOW command 600 as above described is issued as the window type=2 (special) thereby the processing is executed. As a result, the relevant control table becomes as shown in FIG. 5N. Since the area to save the overlapped part by the special window is limited to the special save area 9 of the FM 23, nothing is recorded in the SATYPE 427 of the WCB.

In the embodiment as above described, the save areas of the overlapped window data are composed stepwise from position near the display memory. The display position of each window, the priority, the save area or the like is controlled, thereby high-speed redisplay processing corresponding to various states can be performed.

Distinction of the above-mentioned embodiment form a conventional system will be clarified referring to FIGS. 19A–19F, FIGS. 20A–20F. The conventional system is a system as disclosed in the background of the invention in the specification, and the object of the display control is an example where three general windows are displayed in sequence and further the general window with highest priority is moved and then the windows are eliminated.

FIGS. 19A–19F are diagrams illustrating the save state of the overlapped parts in the prior art, and FIGS. 20A–20F are diagrams illustrating the save state according to the invention. When the data A is displayed on the general window 31 in FIGS. 19A, 20A and the data B is displayed on the general window 32 in FIGS. 19B, 20B, the area data al of the general window 31 overlapped by the general window 32 is saved. Then in the prior art, comparison calculation of the coordinate values of the general windows 31, 32 must be performed so as to infer the overlapped area. On the other hand, in the invention as clearly seen from FIG. 20B, the whole display data A of the general window 31 may be saved as it is, and therefore the comparison calculation of the coordinate values is not necessary.

Figure 19A:
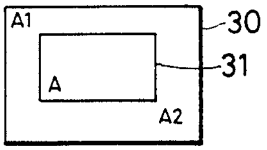
FIG. 19A (PRIOR ART)
FIGS. 19A–19F are schematic diagrams of display surfaces respectively illustrating save state of display data of overlapped parts according to a multi-window control system in the prior art.
Figure 19B:
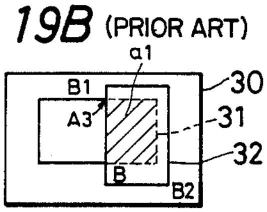
FIG. 19B (PRIOR ART)
Figure 19C:
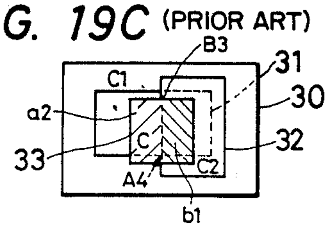
FIG. 19C (PRIOR ART)
Figure 19D:
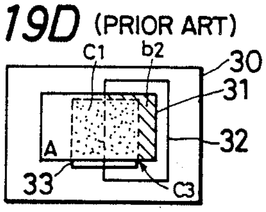
FIG. 19D (PRIOR ART)
Figure 20A:
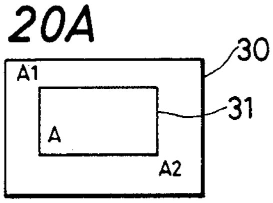
FIGS. 20A–20F are schematic diagrams of display surfaces respectively illustrating save state of display data of overlapped parts according to a multi-window display control system in the invention.
Figure 20B:
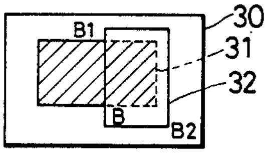
Figure 20C:
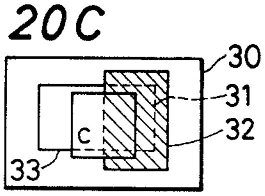
Figure 20D:
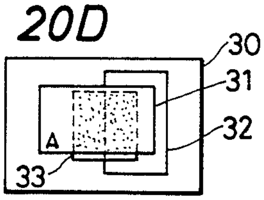

When the data C is displayed on the general window 33 in FIGS. 19C, 20C, in the prior art, the area data a2 of the general window 31 and the area data b1 of the general window 32, overlapped by the general window 33, must be inferred from the comparison results of respective coordinate values and be saved. On the other hand, in the invention, the data B of the general window 32 may be saved as it is.

When the general window 31 displayed in overlapping at the rear side in FIGS. 19D, 20D is displayed again at the front side, in the prior art, the area data b2 of the general window 32 and the area data cl of the general window 33 to be newly overlapped by the general window 31 must be first inferred in similar manner to the above description and save. Subsequently, the area data al, a2 regarding data displayed on the general window 31 saved until then must be resumed to the original position. Thus, in the prior art, not only the comparison calculation of the coordinate values but also the number of save or recovery of the area data are increased. On the other hand, in the invention, the data C of the general window 33 to be newly overlapped by the general window 31 may be saved as it is, and the saved data A may be simply resumed to the original position.

Figure 19E:
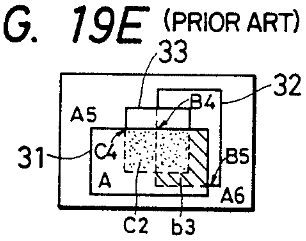
FIG. 19E (PRIOR ART)
Figure 20E:
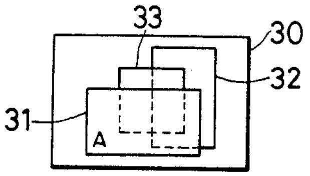

When the display position of the general window 31 is moved in FIGS. 19E, 20*e*, in the prior art, after the displayed data A of the general window 31 is entirely saved and the general window 31 is eliminated, the area data b2 of the general window 32 and the area data cl, overlapped by the general window 31, must be resumed to the original position. Further, the area data b3 of the general window 32 and the area data c2 of the general window 33, to be overlapped regarding the newly displayed position of the general window 31, must be inferred in similar manner to the above description and be saved. Finally, the display data A saved temporarily must be resumed to the new position of the window 31. On the other hand, in the invention, after the display data A of the general window 31 is saved temporarily and the general window 31 is eliminated, redisplay is performed in the order of the general windows 32, 33 overlapped and saved by the general window 31, and finally the display data A saved temporarily is resumed to the new display position of the general window 31.

Figure 19F:
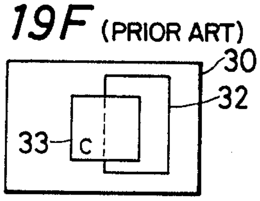
FIG. 19F (PRIOR ART)
Figure 20F:
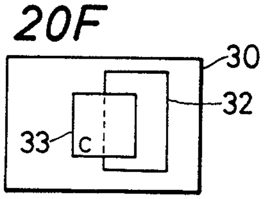

When the general window 31 is eliminated in FIGS. 19F, 20F, in the prior art, all area data b3, c2, overlapped by the general window 31, are resumed to the original position. On the other hand, in the prior art, the general window 31 is eliminated, and all window display data B, C, overlapped by the general window 31, are redisplayed and resumed.

As above described, comparing between the system of the prior art and the system of the invention, it is understood in the former that comparison calculation of the coordinate position of the windows frequently occurs, and frequency of save or recovery of the display dot data is large, and the whole overhead is large. Regarding the data transfer amount for save or recovery, the transfer amount per one time is not always large in the prior art. However, since the number of the display windows increases, and operation of the windows is frequently performed, and further, the save position of the dot data of the window often becomes the external memory, the number of transfer times becomes a problem rather than the data transfer amount does. The method of the invention is excellent also from this viewpoint. Further, as clearly understood from the above description, the control method of the save state is easy in the system of the invention in comparison to the system of the prior art.

A second embodiment of the invention will now be described in detail referring to the accompanying drawings. In this embodiment, in addition to the first control table in the first embodiment, a second control table is used so as to control the window reservation setting regarding data with highest priority among a plurality of display data and the wait queue for display request. Further, the first control table controls the input mode data regarding the display data, and a third control table is used so as to control the wait queue for input completion, the wait queue for privileged input request, and the current input mode data regarding the input device.

Also in this embodiment, the storage position and its relation to the elements in the system are similar to that shown in FIGS. 1A, 2A, 2B, and the detailed description shall be omitted. FIGS. 4E, 4F, 4G show control tables relating to the embodiment. In FIG. 4E, window status management block (WSMB) 40 controls status of the whole window and corresponds to the above-mentioned second table and is composed following fields. Window status flag (STATUS) 401 indicates existence of window reservation setting, and reserved task number for current window (TN) 402 indicates the number of task using a window at the front surface, and wait queue pointer for window reservation (WAITQ) 403 is wait queue pointer of task waiting use of the window on account of factor such as window reservation setting WCB list pointer (WLIST) 41 is a pointer to connect window control block (WCB) 42 in similar manner to the first embodiment. Wait queue of task formed in the WAITQ 403 connects task control block (TCB) 46 as used in general OS.

Window control block (WCB) 42 is the first control table as previously shown. In this embodiment, input mode data (OIMODE) 429 when each window is displayed at the front surface is added to the WCB 42. List to connect the WLIST 41 and the WPT 421 of the WCB is bidirectional list in similar manner to the first embodiment. Relation between each area of the general save buffer 8 of the FM 23, the receive buffer 65 of the SM 21, the save area 39 of the external memory 14 and the saved window display data is controlled by the FMSACB 43, the SMSACB 44, the SSSACB 45 shown in FIGS. 4B, 4C, 4D in similar manner to the first embodiment.

Input device control block (INDCB) 47 shown in FIG. 4F corresponds to the third control table and controls status regarding the input device and is composed of the following fields. Input device status flag (ISTS) 471 indicates whether the input device is used or not, and wait queue pointer for input completion (IREQ) 472 is wait queue pointer of task commanding input request and waiting the data input, and wait queue pointer for privileged input request (IWATQ) 473 is wait queue pointer of task waiting until the input is supplied with the task commands the input request. Input mode data (IMODE) 474 is area to store the input mode data set by the task which commands the input request and waits the data input. In this case, wait queue of the task formed in the IREQ 472,, the IWATQ 473 connects task control block (TCB) 46 as used in general OS. Input data buffer area (INPUT BUFFER) 48 is are to store the input data formed in the data area 3 within the MM 10 of FIG. 1A.

Input processing particularly man-machine interactive input device will be briefly described. Input data dealt with in the interactive input processing includes character code or function code from a keyboard, and coordinate values from a pointing device such as mouse or function code corresponding to predetermined coordinate values. Which data among these should be inputted is given as input mode data in the command of input data area or the like is also given in the command of input request. The task commanding the input request waits until the designated input data is inputted. If the input is not supplied at commanding the request, the task must wait until the input is supplied. In the following description of the embodiment, the input mode data dealt with in the IMODE 474 or the OIMODE 429 are classified into character code, function code and coordinate values, and designated by symbols C, M and P respectively.

Figure 6A:
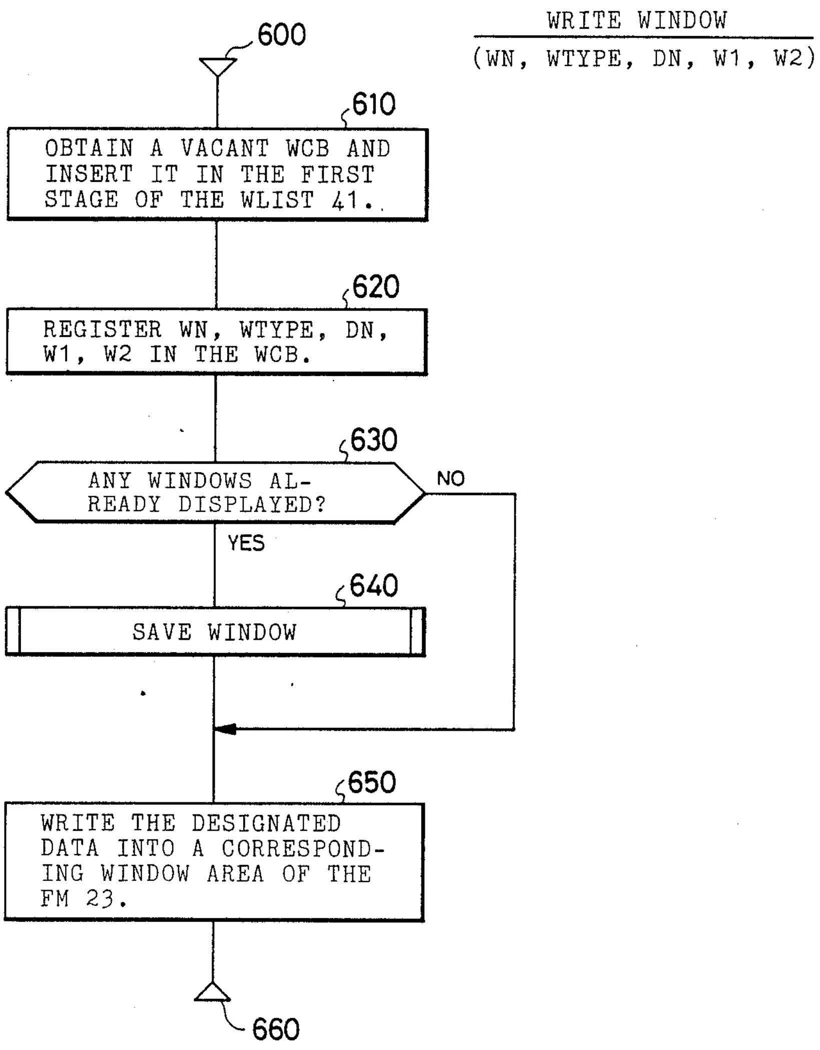
FIGS. 6A, 6B are flow charts respectively illustrating first and second embodiments of write commands of display data in a multi-window display control system of the invention.
Figure 6B:
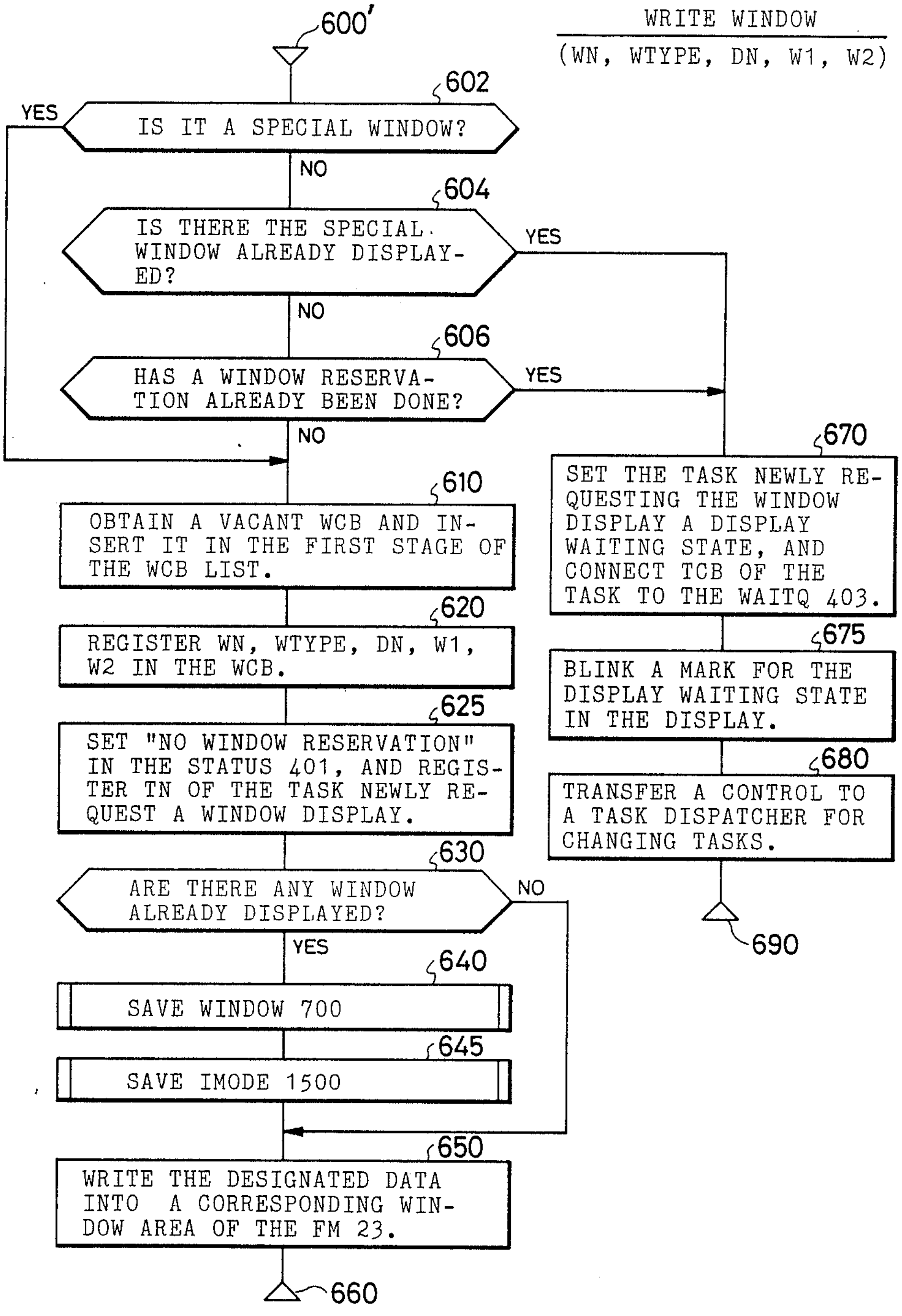
Figure 8A:
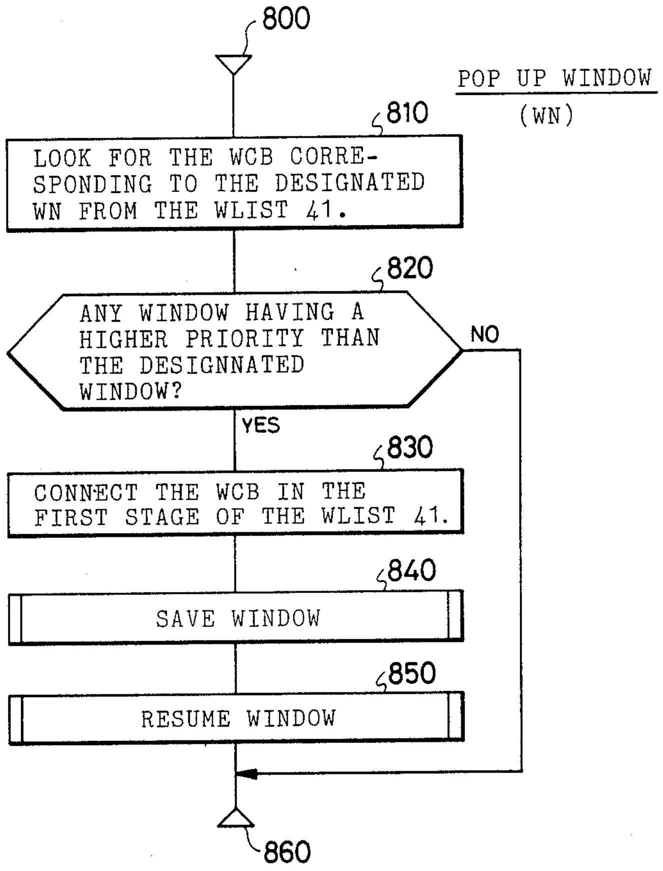
FIGS. 8A, 8B are flow charts respectively illustrating first and second embodiments of command of POP UP WINDOW in a multi-window display control system of the invention.
Figure 8B:
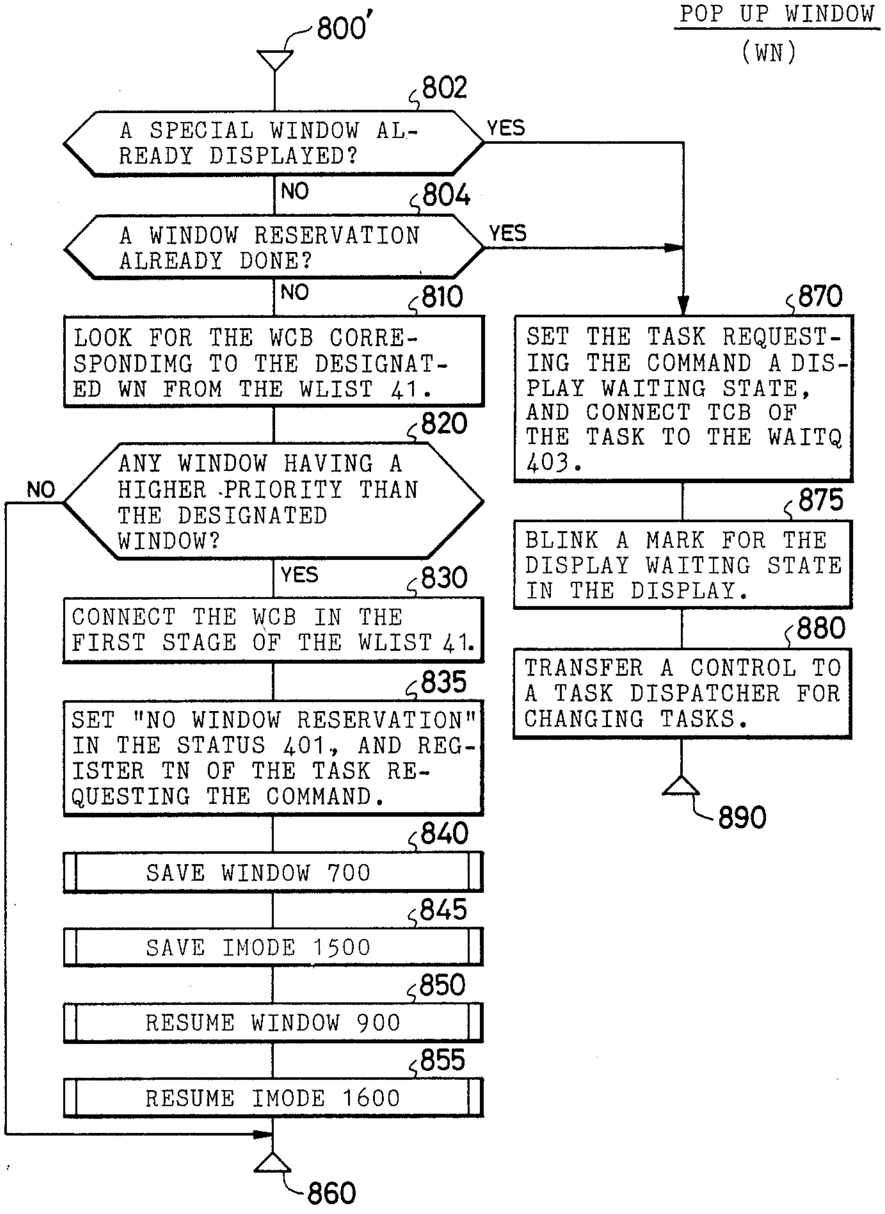
Figure 12B:
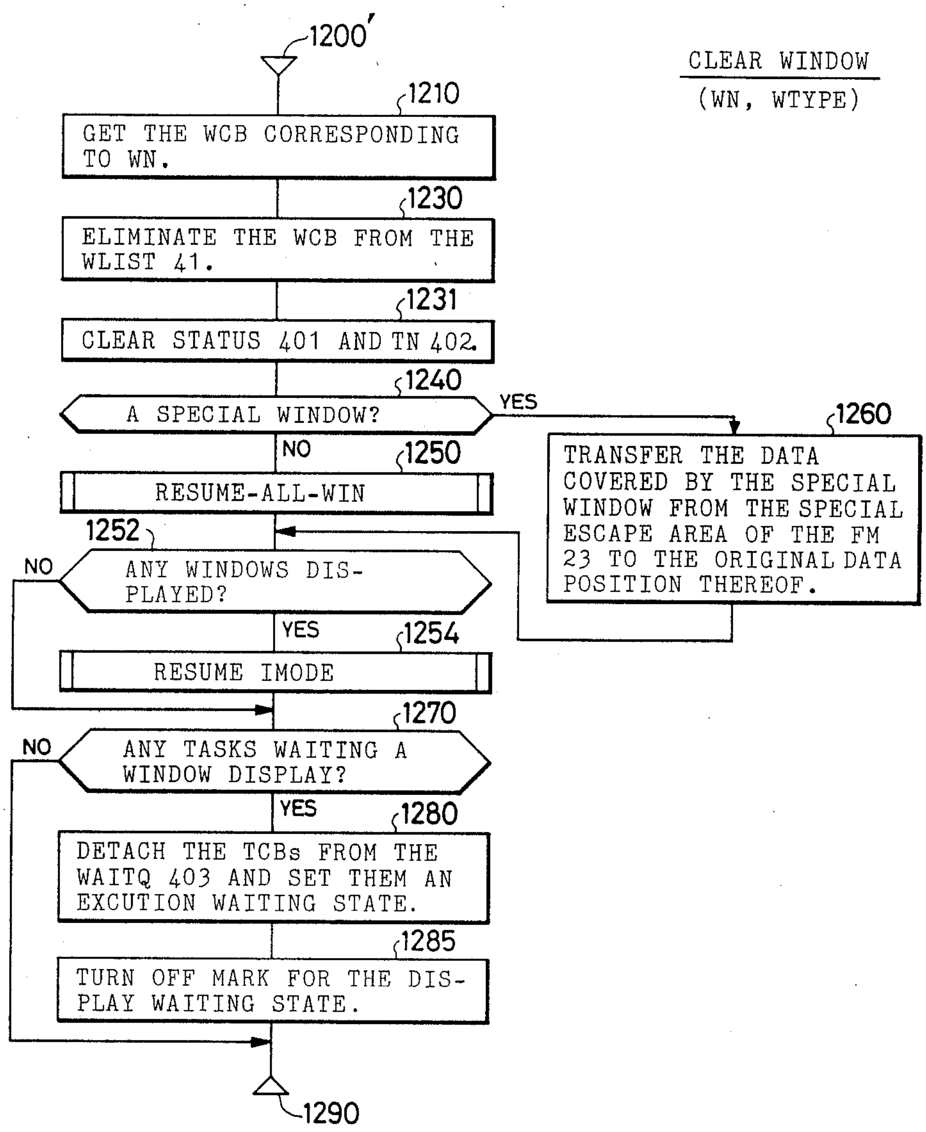

Specific display examples of the embodiment will be described in detail referring to FIGS. 5A–5P, FIGS. 6B, 8B, 12B, 13–18. FIGS. 5A–5P show display window examples together with state of the control table WCB 42 then as described in the first embodiment. FIG. 6B shows process sequence of write command of display data (WRITE WINDOW) 600' embodiment, FIG. 8B shows process sequence of command of POP UP WINDOW 800' in the embodiment, and FIG. 12B shows process sequence of clear command of display data (CLEAR WINDOW) 1200' in the embodiment.

(I) WRITE-WINDOW

Process sequence of the command in FIG. 5A will be described referring to FIG. 6B. Receiving the command, the GP 22 (FIG. 2B) discriminates from the parameter WTYPE of the command regarding whether the window to be displayed is a special data or not (block 602). If it is a special window (WTYPE=2), process is advance to block 610. If not, process is advanced to block 604. In this case, since WTYPE=1 (general), process is advanced to block 604. Further, using the WTYPE 423 of the WCB 42 connected to the WLIST 41, whether any special window was already displayed or not is discriminated. In this case, since the window is displayed for the first time, the decision becomes NO and process is advanced to block 606. In block 606, whether the window reservation was already set or not is discriminated using the STATUS 401 of the WSMB 40. In this case, too, decision becomes NO and control is advanced to block 610. Blocks 610, 620 are similar to that of the first embodiment. "No window reservation" is registered in the STATUS of the WSMB 40, and the task number of the task issuing the command is registered in the TN 402 (block 625). Further, the WPT 421 of the WCB 42a is examined in similar manner to the first embodiment, and whether any window was already displayed or not is discriminated (block 630). In this case, since the window is displayed for the first time, the decision becomes NO and process is advanced to block 650.

In the process sequence 600' in the embodiment, when decision in block 604 is that the special window was already displayed or when decision in block 606 is that the window reservation was already set, opening of a new window is suppressed and the task issuing the command must wait until the state that the window can be opened. If above status occurs, in block 670, the TCB 46 of the task requesting the window display is set to a display waiting state, and the TCB is connected to the WAITQ 403 of the WXMB 40. In order to inform the user that the display request is at waiting state, a mark for the window display waiting state is indicated by blinking at the predetermined position 36 of the display surface 30 (block 675). Control is transferred to a task dispatcher for task changing (block 680). In this constitution, the task issuing the command must wait until the special window is eliminated or until the window reservation is reset.

Next, when the task displaying the window 31 requests the character code input using the input request command IREQ INPUT) 1700 as hereinafter described and is at input completion waiting state, that is, when "C" is set to the IMODE 474 in FIG. 4F, studying will be performed in the case that the general window 32 is defined by the WRITE WINDOW command accompanied by the window number WN=2, the window type WTYPE=1, the segment data number DN= B, and the window coordinates W1=B1, W2=B2 on the window 31, and the data B is displayed as shown in FIG. 5B. The command process sequence in the GP 22 until blocks 602–630 is similar to the above description. In this case, since whether any window was already displayed or not is discriminated YES (present), process is advanced to block 640 and subroutine (SAVE WINDOW) 700 is executed.

Process sequence of the SAVE WINDOW 700 is similar to the first embodiment. When the SAVE WINDOW 700 is finished, control is returned to block 645 of the WRITE WINDOW 600 in FIG. 6B. Then the GP 22 executes the subroutine (SAVE IMODE) 1500.

Figure 15:
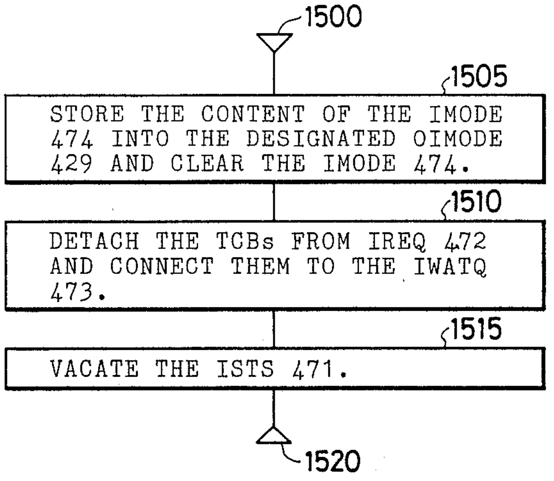
FIG. 15 is a flow chart illustrating an embodiment of subroutine SAVE IMODE in the write command of display data in FIG. 6B.

FIG. 15 shows process sequence of the SAVE IMODE 1500. The SAVE IMODE 1500 saves the input mode data used until then to the WCB 42 of the window corresponding to the task performing data input, and the wait queue for input completion is detached and connected to the wait queue for input privileged input request and the input is changed. Parameter transferred to the SAVE IMODE 1500 is address of the WCB corresponding to the window with display data to be saved. It is address of the WCB 42*a* in this case. In processing of the SAVE IMODE 1500, the input mode data (character code input "C" in this case) controlled by the IMODE 474 of the INDCB 47 and used until then is saved to the OIMODE 429 of the designated WCB 42*a*, and the IMODE 474 of the INDCB 47 is cleared (block 1505). Subsequently, the TCB corresponding to the task waiting input completion is detached from the IREQ 472 of the INDCB 47 and connected to the IWATQ 473 of the INDCB (block 1510), and "vacant input device" is set to the ISTS 471 of the INDCB 47 (block 1515), and control is returned to the routine calling the subroutine (block 1520). In this case, control is returned to block 650 of FIG. 6B.

The GP 22 explodes the designated data B into the display dot data, and writes the display data into the rectangular area corresponding to the window coordinates B1, B2 of the display buffer 7 of the FM 23. As a result, the display surface 30 becomes as shown in FIG. 5C, and relation of the WCB 42*a*, 42*b* at that time becomes as shown in FIG. 5D. Note that the character code input "C" is set to the OIMODE 429 of the WCB 42*a*.

Further, when the task displaying the window 32 requests the coordinate value input using the input request command (REQ INPUT) 1700 as hereinafter described and is at input completion waiting state, that is, when "P" is set to the IMODE 474 in FIG. 4F, studying will be performed in the case that the window 33 is defined on the windows 31, 32 and the data C is displayed as shown in FIG. 5E. Receiving the WRITE WINDOW command similar to the first embodiment, process sequence of FIG. 6B, FIG. 7, FIG. 15 is executed as above described. As a result, relation of the WCB 42 becomes as shown in FIG. 5F. Particularly, "P" representing the coordinate value input is set to the OIMODE 429 of the WCB 42*b* regarding the display data of the general window 32.

(II) POP-UP-WINDOW

In the embodiment, studying will be performed in the situation where the POP UP WINDOW command is executed from the state of FIG. 5E into the state of FIG. 5G in similar manner to the first embodiment will be studied. The task displaying the window 33 requests the function code input using the input request command (REQ INPUT) 1700 as hereinafter described and is at input completion waiting state. That is, "M" is set to the IMODE 474 of FIG. 4F. Process sequence of the command will be described referring to FIGS. 8B, 9, 15, 16. In the POP UP WINDOW 800' of FIG. 8B, decision is performed regarding whether any special window was already displayed and whether the window reservation was already set in similar manner to the description of the WRITE WINDOW command of FIG. 6B (blocks 802, 804). Only when both are NO, process is advanced to block 810 and similar processing to the first embodiment is performed. If at least one among the two conditions is YES, the task is at waiting state (block 870). In order to inform the user that the window display request is at waiting state, the window display waiting mark is indicated by blinking at the predetermined position 36 of the display surface 30 (block 875), and control is transferred to the task dispatcher (block 880).

Blocks 810, 820, 830 are similar to that in the first embodiment. The GP 22 sets "no window reservation" to the STATUS 401 of the WSMB 40, and sets the task number of the task requesting the command to the TN 402 (block 835). The GP 22 executes the subroutine SAVE IMODE 1500 and changes the input (block 845). Further, the GP 22 executes the subroutine RESUME WINDOW 900 and resumes the display data regarding the window WN saved by overlap until then and performs redisplay of all data of the window (block 850), and subsequently executes the subroutine RESUME IMODE 1600 shown in FIG. 16 and supplies the input again to the task displaying the window (block 855).

As a result of processing the subroutine SAVE WINDOW 700, the window 31 is saved to the area 39, the window 32 is saved to the receive buffer 6, and the window 33 is saved to the general save area 8. In block 845, parameter supplied to the subroutine SAVE IMODE 1500 is the top address of the WCB 42*c* which is connected to the front stage of the WLIST 41 before the previously obtained WCB 42*a* is connected. As a result of processing the subroutines 700 and 1500, state of each control table becomes as shown in FIG. 5P. Parameter transferred to the subroutine RESUME-WINDOW 900 in block 850 is the top address of the WCB 42*a* corresponding to the window 31 to resume the overlapped display data. Processing of the subroutine 900 is similar to the first embodiment and the description shall be omitted.

Figure 16:
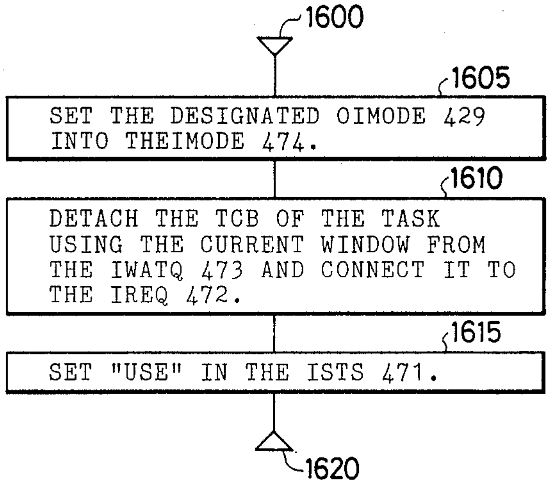
FIG. 16 is a flow chart illustrating an embodiment of subroutine RESUME IMODE in the command of POP UP WINDOW in FIG. 8B.

The parameter transferred to the subroutine RESUME-IMODE 1600 in block 855 is the top address of the WCB 42*a* corresponding to the window 31 to resume the overlapped display data. FIG. 16 shows process sequence of the RESUME IMODE 1600.

The GP 223 transfers control to the RESUME IMODE 1600, and resumes the old input mode data of the OIMODE 429 of the WCB 42a (character code input "C" in this case) to the IMODE 474 of the INDCB 47 (block 1605). Next, the TCB 46 corresponding to the task displaying from the IWATAQ 473 of the INDCBH 47 and connected to the IREQ 472 (block 1610), and "use of input device" is set to the ISTS 471 of the INDCB 47 (block 1615), and control is returned to the routine calling the subroutine (block 1620). In this case, control is returned to the block 860 of the POP UP WINDOW 800' in FIG. 8B, and processing of the whole command is finished. As a result, the display surface 30 becomes as shown in FIG. 5G, and the WCB 42 then becomes as shown in FIG. 5H.

(III) MOVE WINDOW

In the embodiment, the process sequence of the command is similar to that of the first embodiment and therefore the description shall be omitted.

(IV) CLEAR WINDOW

The process sequence of the command will be described referring to FIG. 12B. Input processing is completed, when the command is issued. Receiving the CLEAR WINDOW command 1200 accompanied by the window number WN=1, and the window type WTYPE=1, the GP 22 immediately obtains the top address of the WCB 42a corresponding to the WN=1 (block 1210). The WCB 42a is eliminated from the list shown by the WLIST 41 into vacant state (block 1230). Further, the priority window flag STATUS 401 of the WSMB 40, and the window use task number 402 are cleared (block 1231). Whether the window is a special window or not is discriminated (block 1240). If so, process is advanced to block 12690, and the display data covered by the special window is taken from the special save area of the frame memory and then returned to the original position of the frame memory. Since this case relates to the general window, process is advanced to block 1250. The subroutine RESUME ALL WIN 1100 is similar to that of the first embodiment and therefore the description shall be omitted.

Whether any window is displayed is discriminated using the WLIST 41 of the WSMB 40 (block 1252). If so, the subroutine RESUME IMODE 1600 is executed, and the input is changed again to the task corresponding to the display window at the front surface (block 1254). In this case, since the window 33 is displayed and the function code is waiting input, "M" is resumed in the IMODE 474 of the INDCB 47. Finally, whether any task is window display waiting or not is discriminated using the WAITQ 403 of the WSMB 40 (block 1270). If wait queue of the task exist, the wait queue of task is released and is set to execution waiting state (block 1280), and the window display waiting mark 36 at blinking indication of the predetermined position of the display surface 30 is eliminated (block 1285). As a result, the display surface 30 becomes as shown in FIG. 5K, and the relevant control table becomes as shown in FIG. 5L. FIG. 5M shows the display surface 30 when the special window 35 is displayed in the state of FIG. 5 as described in the first embodiment. The relevant control table becomes as shown in FIG. 5N, and "P", "M" are set to the OIMODE 429 of the WCB 42b, 42c respectively.

(V) SET WRSV

Figure 13:
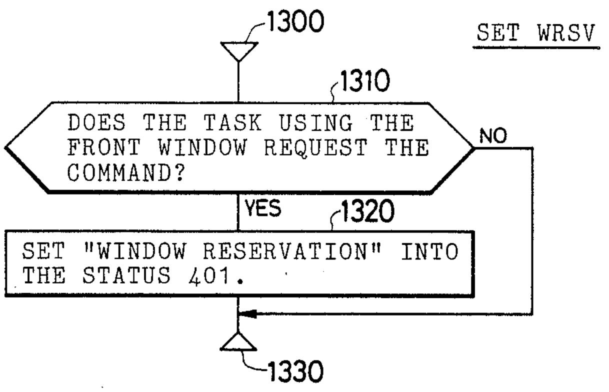
FIG. 13 is a flow chart illustrating an embodiment of command of SET WINDOW RESERVATION in a multi-window display control system of the invention.

FIG. 13 shows process sequence of the window setting command SET WRSV 1300. Receiving the command, the GP 22 discriminates whether the task issuing the command uses the existing window (the front window) or not using the TN 402 of the WSMB 40 (BLOCK 1310). If so, process is advanced to block 1320, and the window reservation setting flag in the STATUS 401 of the WSMB is set, thereby the generation and changing of the window by the task other than that using the existing window can be suppressed.

(VI) RESET WRSV

Figure 14:
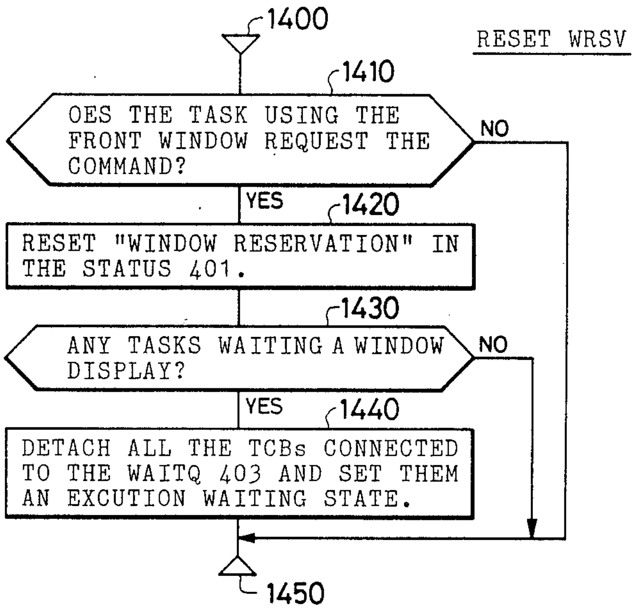
FIG. 14 is a flow chart illustrating an embodiment of command of RESET WINDOW RESERVATION in a multi-window display control system of the invention.

FIG. 14 shows process sequence of the window reservation reset command RESET WRSV 1400. Receiving the command, the GP 22 discriminates whether the task issuing the command uses the existing window (the front window) or not (block 1410). If so, the window reservation setting flag in the STATUS 401 of the WSMB 40 is reset (block 1420). Next, whether any task waits the window display or not is discriminated using the WAITQ 403 of the WSMB 5 40 (block 1430). If so, the TCB of the task connected to the WAITQ 403 is entirely released and made wait queue for execution.

(VII) REQ INPUT

Figure 17:
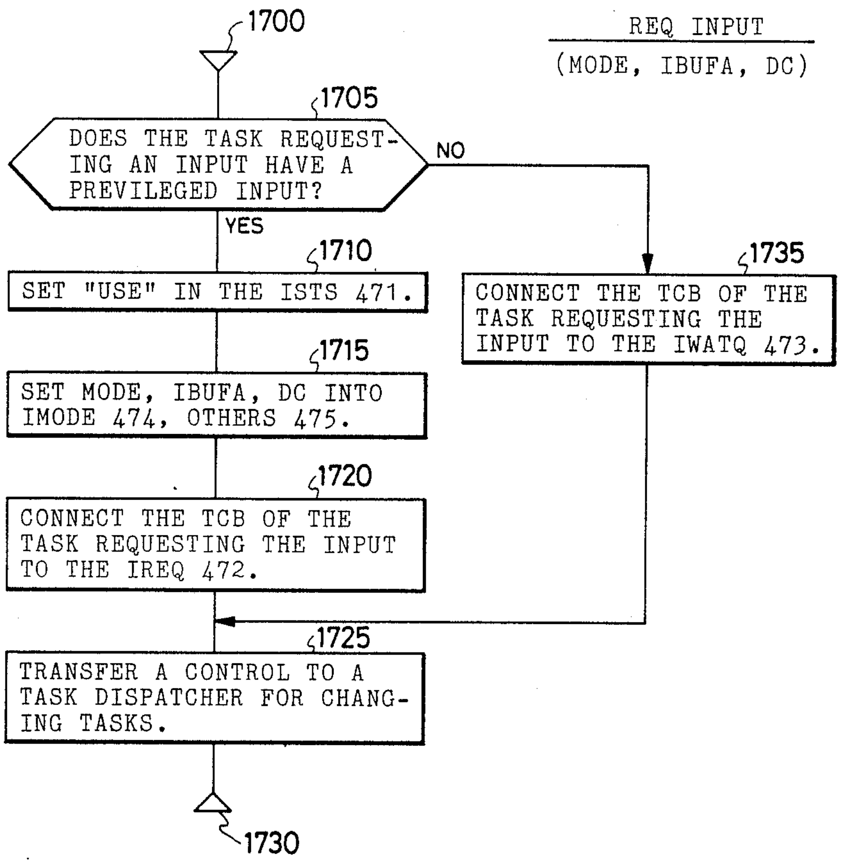
FIG. 17 is flow chart illustrating an embodiment of command of input request in a multi-window display control system of the invention.

FIG. 17 shows process sequence of the input request command REQ INPUT 1700. In the command, the TN 402 of the WXSMB 40 is examined, therefore whether the task issuing the input request command displays the window and has the input right is discriminated (block 1705). If so, process is advanced to block 1710; if not, process is advanced to block 1735.

In block 1710, the ISTS 471 of the INDCB 47 is set to "use of input device". The input mode data designated by parameter of the command and the input area top address (IBUFA) and the input data amount (DC) are set respectively to the IMODE 474, OTHERS 475 of the INDCB 47 (block 1715). Further, in order that the task issuing the command is at waiting state until the input data is obtained, the TCB of the task is connected to the IREQ 472 of the INDCB 47 (block 1720), and finally control is transferred to the task dispatcher for the task changing (block 1725).

On the other hand, on block 1735, since the task issuing the command does not have the input right, in order that the task is at waiting state until the input right is obtained, the TCB of the task is connected to the IWATQ 473 of the INDCB 47, and finally control is transferred to the task dispatcher for the task changing (block 1725).

According to the above processing, the right to input is supplied only to the task displaying the window at the front surface, and the task displaying other windows is at waiting state until the window is displayed at the front surfaces.

(VIII) INT INPUT

Figure 18:
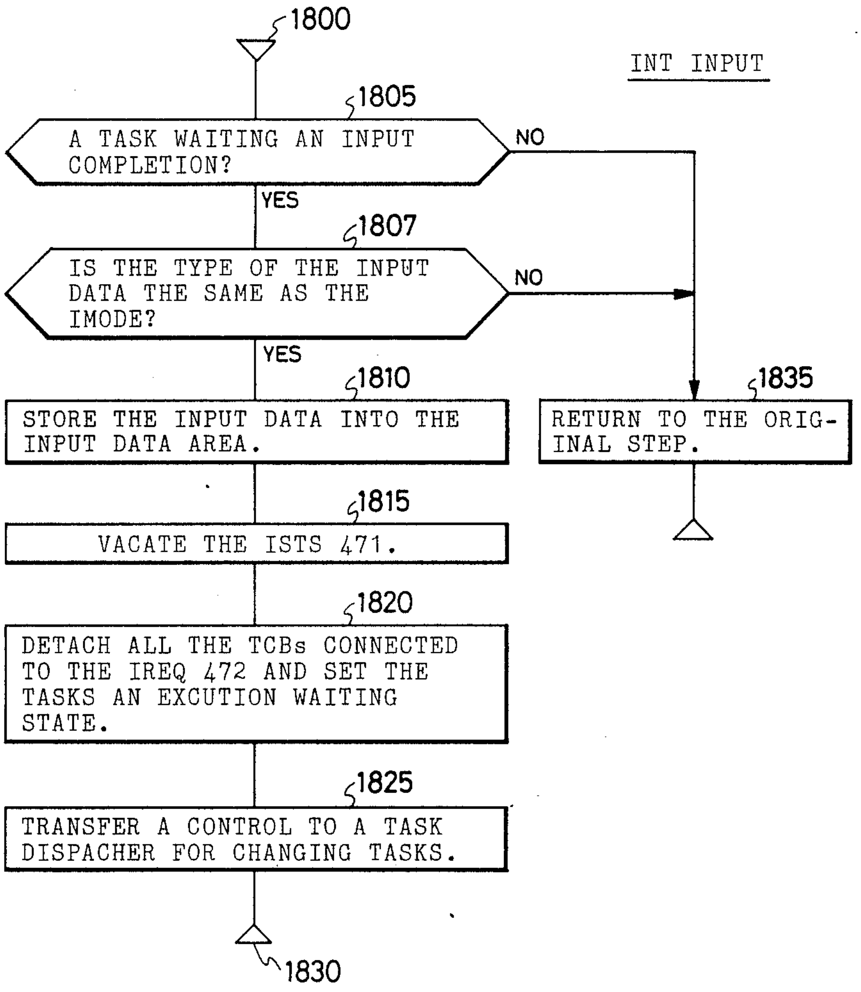
FIG. 18 is a flow chart illustrating an embodiment of command of input interrupt in a multi-window display control system of the invention.

FIG. 18 shows process sequence of the input interrupt processing INT INPUT 1800. In the process sequence, the IREQ 471 of the INDCB 47 is examined, thereby whether any task waits the input completion or not is discriminated (block 1805). If so, process is advanced to block 1807; if not, process is advanced to block 1835. In block 1807, whether the input data is coincident with the IMODE 474 of the INDCB 47 or not is discriminated. If so, process is advanced to block 1810; if not, process is advanced to block 1835.

In block 1810, the input data is taken into the input area 48. The ISTS 471 of the INDCB 47 is set to "vacant input device" (block 1815). Further, in order to release wait state of the task waiting until the input data is obtained, the TCB of the task is detached from the IREQ 472 of the INDCB 47 (block 1820), and finally control is transferred to the task dispatcher for the task changing (block 1825).

On the other hand, in block 1835, since no task is waiting the input completion or the input data is not coincident with the input mode data, processing is not performed and control is returned to the original interrupt portion.

According to the above processing, the input data displays the window at the front surface, and is transferred to only the task having the input right and not transferred to the task displaying other windows even if the task issues the input command previously.

As described in detail, according to the embodiment, the user controls the window reservation flag, thereby the display content of the window can be guaranteed during arbitrary period, and the window control function can be utilized conveniently.

Summarizing effects of the invention as described in detail, in a system where a plurality of data are overlapped and displayed simultaneously on the same display device, (1) redisplay is possible at high speed in changing of the display position or elimination of the display content, (2) the display priority may be fixed if necessary until finishing of predetermined operation by the user so as to suppress display of new data or change of the display priority of the already displayed data, (3) even if position relation of each display data is changed, only the display data at the front surface can be always made the input object.

What is claimed is:

1. A multi-window display control system which is composed of a central processing unit, a main memory, a shared memory, an external memory, an input means, a display means and a display memory for storing a plurality of display data being overlapped and displayed, said system comprising:

a display processing means for performing display processing of a plurality of display data;

a first save area installed on the display memory for temporarily saving overlapped data of the plurality of display data;

a second save area installed on the shared memory for temporarily saving overlapped data of the display data;

a third save area installed on the external memory for temporarily saving overlapped data of the plurality of display data;

a first control table installed on the main memory for controlling display position, mutual priority for display, and a save area during overlap, regarding each of a plurality of display data stored in the display memory, wherein said display processing means controls display of the plurality of display data using the first control table, the first, second and third save areas, and the display memory.

2. A multi-window display control system according to claim 1, further comprising:

a second control table installed on the main memory for controlling window reservation setting and wait queue for display request regarding data with highest priority among a plurality of display data.

3. A multi-window display control system according to claim 2, further comprising:

a third control table installed on the main memory for controlling wait queue for input completion, wait queue for privileged input request, and current input mode data, regarding the input means, wherein said first control table also controls the input mode data regarding each of the plurality of display data stored in the display memory.

4. A multi-window display control system according to claim 1, wherein said display processing means supplies the highest priority to the first save area and the lowest priority to the third save area, when overlapped data of a plurality of display data are saved to the first, second and third areas.

5. A multi-window display control system according to claim 1, wherein said first save area comprises a special save area for saving overlapped data by a special data window, and a general save area for saving overlapped data by a general data window.

6. A multi-window display control system according to claim 5, wherein overlapped data by the special data window is a preceding display data at the display position of the special data window.

7. A multi-window display control system according to claim 5, wherein overlapped data by the general data window is a whole display data of a window with highest priority among preceding display windows at the display position of the general data window.

8. A multi-window display control system displaying a plurality of display data in overlapped state on a display means, said system comprising:

a memory means for storing at least graphic or character data to be displayed;

a central processing unit for commanding request to display the plurality of display data based on the graphic or character data;

a display memory for storing at least the plurality of display data;

a display processing means for preparing display data from the graphic or character data based on request from the central processing unit and storing the display data in the display memory;

an input means for inputting at least the graphic or character data into the memory means;

a first save area installed on the display memory for temporarily storing overlapped data of the display data;

a second save area installed on the memory means for temporarily storing overlapped data of the display data; and a first control table installed on the memory means for controlling display position, mutual priority for display, and a storage area during overlap, regarding each of a plurality of display data stored in the display memory.

9. A multi-window display control system according to claim 8, wherein said display processing means supplies higher priority to the first save area, when the overlapped data are stored in the first and second save areas.

10. A multi-window display control system according to claim 8, wherein said first save area comprises a special save area for saving overlapped data by a special data window, and a general save area for saving overlapped data by a general data window.

11. A multi-window display control system according to claim 8, further comprising:

a second control table installed on the memory means for controlling window reservation setting and wait queue for display request regarding data with highest priority among the plurality of display data.

12. A multi-window display control system according to claim 11, further comprising:

a third control table installed on the memory means for controlling wait queue for input completion regarding the input means, wait queue for privileged input request regarding the input means, and input mode data regarding display data at the front surface, wherein said first control table also controls the input mode data regarding each of the plurality of display data.

13. A multi-window display control system for displaying a plurality of display data in overlapped state on a display means, said system comprising:

a bus;

a memory means connected to the bus for storing at least graphic or character data;

a shard memory connected to the bus for temporarily storing at least the graphic or character data;

a central processing unit connected to the bus for transferring the graphic or character data form the memory means into the shard memory and commanding display request based on the transferred graphic or character data;

a display processing means connected to the bus for exploding the display data from the graphic or character data transferred to the shared memory based on the request from the central processing unit;

a display memory connected to the bus for storing at least the display data;

an input means connected to the bus for inputting at least the graphic or character data;

an external memory connected to the bus;

a first save area installed on the display memory for temporarily saving overlapped data of a plurality of display data;

a second save area installed on the shared memory for saving the overlapped display data and;

a third save area installed on the external memory for saving the overlapped display data.

14. A multi-window display control system according to claim 13, further comprising:

a first control table installed on the main memory for controlling display position, mutual priority for display, and input mode data, regarding each of a plurality of display data stored in the display memory;

a second control table installed on the main memory for controlling task number of display data with highest priority among the plurality of display data, and wait queue for display request; and a third control table for controlling wait queue for input completion regarding the input means, wait queue for privileged input request, and input mode data set by the task waiting input completion.

15. A multi-window display control system according to claim 14, wherein said display processing means supplies highest priority to the first save area and lowest priority to third save area, when the overlapped displayed data are saved.

* * * * *